United States Patent [19]
Taylor et al.

[11] Patent Number: 5,973,700
[45] Date of Patent: *Oct. 26, 1999

[54] METHOD AND APPARATUS FOR OPTIMIZING THE RESOLUTION OF IMAGES WHICH HAVE AN APPARENT DEPTH

[75] Inventors: Roy Y. Taylor, Scottsville; Roger A. Morton, Penfield, both of N.Y.

[73] Assignee: Eastman Kodak Company, Rochester, N.Y.

[ * ] Notice: This patent is subject to a terminal disclaimer.

[21] Appl. No.: 07/946,226

[22] Filed: Sep. 16, 1992

[51] Int. Cl.$^6$ .................................................. G06T 15/20
[52] U.S. Cl. ............................................... 345/427
[58] Field of Search ................... 395/119, 127; 355/22; 354/112, 114, 115; 345/427

[56] References Cited

U.S. PATENT DOCUMENTS

| | | |
|---|---|---|
| 3,915,569 | 10/1975 | Pölzleitner . |
| 3,953,869 | 4/1976 | Wah Lo et al. .......................... 354/115 |
| 3,960,563 | 6/1976 | Lo et al. ...................................... 96/40 |
| 4,429,328 | 1/1984 | Jones, Jr. et al. ......................... 358/88 |
| 4,463,380 | 7/1984 | Hooks, Jr. ................................ 358/160 |
| 4,478,639 | 10/1984 | Smith et al. ................................. 430/9 |
| 4,494,864 | 1/1985 | Smith et al. ............................... 355/22 |
| 4,558,359 | 12/1985 | Kuperman et al. ....................... 358/89 |
| 4,575,207 | 3/1986 | August .................................... 354/112 |
| 4,625,289 | 11/1986 | Rockwood ............................. 395/119 |
| 4,625,290 | 11/1986 | White ..................................... 395/119 |
| 4,647,965 | 3/1987 | Imsand ..................................... 358/88 |
| 4,650,282 | 3/1987 | Lo .......................................... 350/130 |
| 4,668,063 | 5/1987 | Street ..................................... 354/112 |
| 4,724,449 | 2/1988 | Wright .................................... 354/112 |
| 4,757,350 | 7/1988 | Street ....................................... 355/22 |

(List continued on next page.)

FOREIGN PATENT DOCUMENTS

| | | |
|---|---|---|
| A-0 520 179 | 5/1992 | European Pat. Off. . |
| WO-A-90 10996 | 9/1990 | WIPO . |

OTHER PUBLICATIONS

"Applied Photographic Optics", Sidney F. Ray, pp. 400–408 and 448–452, 1988, Focal Press.

*Primary Examiner*—Anton Fetting
*Attorney, Agent, or Firm*—Edward Dugas; J. Randall Beckers

[57] ABSTRACT

Several different methods alone or in combination can be used to reduce image jump or stutter. The image plane on which the original image is taken can be mechanically or electronically rotated about a point of rotation in the scene. The number of original images which are viewed could be increased by interpolation. The subtended viewing angle of the viewpoints can be reduced and viewpoints within the subtended viewing angle can be increased by interpolation. Reduced subtended viewing angle images can be created for each eye. The depth of focus of the images can be changed by identifying the images that jump and blurring the images outside the area of interest. The original images can be processed to move the image plane further back from the objects in the scene. Some of the images ordinarily existing between the right and left eye perspectives can be eliminated. The objects in the background of the scene being photographed can be identified and shifted forward in the scene. The highest detail volume of the images can be identified and the images can be processed to rotate around the volume. The highest detail area can be identified and the original images processed to displace the images to minimize the movement of the highest detail area. The original images can be viewed and a point within each image identified to align the point from view to view using a linear or other transformation.

24 Claims, 18 Drawing Sheets

U.S. PATENT DOCUMENTS

| | | | |
|---|---|---|---|
| 4,800,407 | 1/1989 | Wah Lo | 354/114 |
| 4,812,988 | 3/1989 | Duthuit et al. | 395/119 |
| 4,852,972 | 8/1989 | Wah Lo | 350/131 |
| 4,870,600 | 9/1989 | Hiraoka | 395/119 |
| 4,897,806 | 1/1990 | Cook et al. | 395/119 |
| 4,903,069 | 2/1990 | Lam | 355/22 |
| 4,956,706 | 9/1990 | Ohba | 358/93 |
| 4,962,422 | 10/1990 | Ohtomo et al. | 358/38 |
| 5,014,126 | 5/1991 | Pritchard et al. | 358/91 |
| 5,019,855 | 5/1991 | Lam | 355/22 |
| 5,028,950 | 7/1991 | Fritsch | 355/22 |
| 5,049,987 | 9/1991 | Hoppenstein | 358/88 |
| 5,059,771 | 10/1991 | Ip et al. | 235/64.7 |
| 5,113,213 | 5/1992 | Sandor et al. | 355/22 |
| 5,132,839 | 7/1992 | Travis | 359/462 |
| 5,276,785 | 1/1994 | Mackinlay et al. | 345/427 |
| 5,455,689 | 10/1995 | Taylor | 358/450 |

METHOD AND APPARATUS FOR OPTIMIZING THE RESOLUTION OF IMAGES WHICH HAVE AN APPARENT DEPTH

CROSS REFERENCES TO RELATED APPLICATIONS

The present application is related to U.S. Application entitled Electronically Interpolated Integral Photography System by Taylor et al. having U.S. Ser. No. 07/722,713 and Kodak Docket No. 61,496, to U.S. Application entitled Method of Modifying a Time Varying Image Sequence By Estimation of Velocity Vectors by Fogel having U.S. Ser. No. 07/823,723 and Kodak Docket No. 61,796 and to U.S. Application entitled Three Dimensional Photographic Printing Method And Apparatus by Manico having U.S. Ser. No. 07/824,824 Kodak Docket No. 62,918 all of which are assigned to Eastman Kodak Co. and incorporated herein by reference.

BACKGROUND OF THE INVENTION

1. Field of the Invention

The present invention is directed to methods and apparatus for optimizing images with an apparent depth and, more particularly, to methods and apparatus which use one or a combination of several techniques to minimize image jump or stutter in depth images.

2. Description of the Related Art

Images which have an apparent depth can be produced in a number of different ways. Images produced using integral, lenticular and barrier technology suffer from a problem commonly called image jump or stutter as the point of view of the viewer of the image shifts. This problem can be partially understood by using FIG. 1 which shows a cross sectional view through an integral or lenticular photograph. Portions of the images 1–4, originally photographed from different image taking viewpoints, are formed on a photographic media 10. These portions of the images are projected into viewer space by a faceplate 12, sometimes called an overlay or faceplate, which has formed on one surface a series of cylindrical or spherical refracting surfaces having a positive diopter power. The curvature of the refracting surfaces and the faceplate thickness is predetermined by design to establish a local lens focal length substantially equal to faceplate thickness. Therefore, images coincident with the rear surface of the faceplate will be projected to an infinite conjugate on the opposite side. The combination of the curved surface and the faceplate material could be considered as a lens or lenslet and the entire assemblage an array of lenses or lenslets. In the special case of lenslets formed as parallel cylinders, the lenslets are commonly called lenticules, therefore in the case of a lenticular photograph the images 1–4 on substrate 10 positioned under each lens 14 are thin linear slices of the original photographs (or images captured) and the lenses 14 are cylindrical. In the case of an integral photograph, the images 1–4 on substrate 10 are circular portions of the original photographs and the lenses 14 are spherical. Because the images 1–4 formed on the substrate 10 are discrete portions of the original images, as the viewpoint of the viewers shift from viewpoint 1 to viewpoint 2, a transition or jump occurs between the images. This sudden shift makes the photograph seem less real.

The jump problem is even more apparent when objects in the original scene are separated depth wise by a significant distance. This further problem is illustrated and exaggerated in FIG. 2 in which two objects 16 and 18, when photographed through two cameras 20 and 22 (or a single camera with multiple lenses), produce two images 24 and 26. Between these two images 24 and 26, not only does the position of object 16 in the foreground move or displace toward the right a distance $d_1$, but the position of object 18 in the background displaces a different distance $d_2$. If the viewer is viewing these images through a lenticular or integral faceplate on a photograph and concentrates attention on the object 16, for example a person, when the view jumps between images 24 and 26, object 18, which could be a tree behind the person, will experience a large displacement or shift. This shift of objects at a distance behind the attention or focal point also makes the photographs seem less real.

Prior art systems for capturing multiple images and creating depth images have typically used optical capturing system (cameras) and optical printing systems (enlargers with special mirrors). Such systems are not capable of moving images or portions of images relative to each other or of creating images in between the actually captured images. That is, the prior art optically based systems are incapable of solving the image jump or stutter problem.

SUMMARY OF THE INVENTION

It is an object of the present invention to reduce image stutter or jump in depth images.

It is also an object of the present invention to improve the realism of integral, barrier or lenticular photographs.

It is also an object of the present invention to improve view or angular resolution.

The above objects can be attained by using several different methods alone or in combination to reduce image jump or stutter. The image plane on which the original image is taken can be mechanically or electronically rotated about an arbitrary point of rotation which can be located between the foreground and background objects or on one of the objects. This keeps the rotation point centrally located in the views and reduces the distance which objects in the scene appear to move relative to each other from viewpoint to viewpoint. The number of images which are viewed could be increased from the original set of images by interpolation. This increases the number of viewpoints and reduces the displacement of objects in the image from viewpoint to viewpoint. The subtended viewing angle of the viewpoints can be reduced and the number of images and viewpoints within the subtended viewing angle can be increased by interpolation. The reduction in subtended viewing angle reduces the amount of overall image jump within the viewing angle while the increase in the number of viewpoints within the subtended angle further reduces the displacement from viewpoint to viewpoint. The depth of focus of the original images can be electronically changed by identifying the images that jump and the displacement of the jump, and then blurring those images outside the area of interest. The jumping of the images in the background will be less distracting since the images are not in focus. The original images can be processed to move the image plane further back from the objects in the scene. This corresponds mechanically to moving the camera further back from the original scene and reduces the displacement between views. Some of the images, in both the interpolation methods and subtended viewing angle reduction methods, ordinarily existing between the right and left eye perspectives and which would normally be seen if the photograph is translated or turned can be eliminated. The remaining number of images in the left and right eye perspectives can be increased by interpolation. This limits the preferred viewing angle of the photograph but increases depth resolution. The highest detail or interest area of the images can be identified and the images can be processed to rotate around the area of highest detail. The highest interest area can be made into the highest detail area by focusing on the highest interest area with a low f-stop lens during image capture. Rotation about the highest detail area substantially reduces the jump of the highest detail area. With the highest detail area identified, the original images can be processed to linearly displace the images, so that the movement of the highest detail area is minimized. The original images can be viewed and an arbitrary alignment point within each image identified. The views can then be processed to align the alignment point from view to view using a linear or other transformation. The alignment of the particular point reduces the jump of that point within the depth image to substantially zero and correspondingly reduces jump of background objects.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention will be described with respect to producing the viewed depth image as a lenticular photograph, however, the present invention applies to integral and barrier photographs, as well as cathode ray tube displays with lenticular, barrier and integral overlays placed over the faceplate of the display. A depth image is generally a lenticular or integral or barrier display of image segments which change with an observer's position relative to the display in such a manner that stereopsis is experienced by the observer. The realism of a depth image is increased if there are enough image segments recorded so that the observer's head can be moved and additional stereographic views of the scene become visible.

Figure 3:
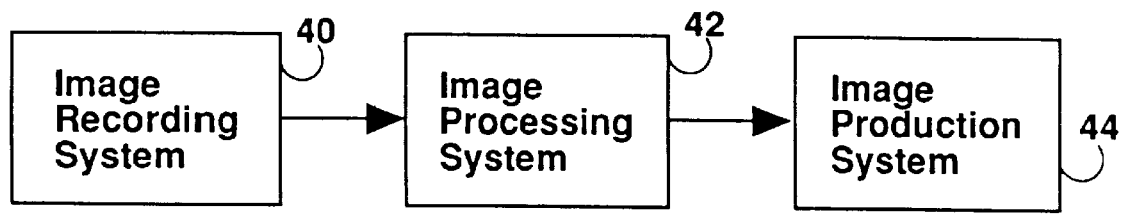
FIG. 3 depicts the hardware components of the present invention.

The typical hardware used by the present invention to produce improved resolution depth images is illustrated in FIG. 3 and has three components: an image recording system 40, an imaging processing system 42 and an image production system 44. The image recording system can be several cameras arrayed in a jig, a single camera slidable to different positions in a jig, or a single camera in a single position but having multiple apertures for recording different views. If the cameras are not electronic, this recording system would also include an image scanner for scanning the film negative produced by the cameras and converting the negative image into an electronic image which is provided to the image processing system 42. A typical image scanner would be the 35 mm Photo CD Film Scanner available from Eastman Kodak Co. The image recording system could bypass the film to digital conversion by providing a high resolution electronic camera for recording multiple taking views of the objects being photographed. Once the image has been digitized, the image will be processed in accordance with the processes discussed later herein by a computer suitable for image processing such as the VAX 4000 available from Digital Equipment Corp. Once the processed image is produced it is reproduced by an image processing system 44 which can include a light valve film writer, such as LVT Model 1620B from Eastman Kodak Co., or a printing system as described in the related Manico application. The related Taylor and Manico applications previously mentioned describe overall systems which will take multiple pictures, create lenticular images and print those images on an appropriate media.

Figure 4:
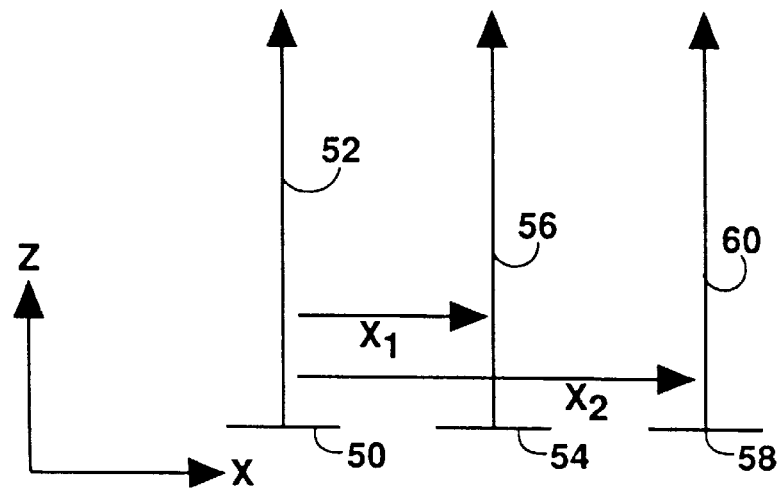
FIG. 4 depicts a parallel perspective axis system.

In a real world image, as illustrated in FIG. 4, as the position of an imager, such as the eye, a camera, or an electronic sensor, changes by moving horizontally in x, and provided the imager is maintaining a constant angle of gaze, (that is, the imager points to the same point at infinity) every element of the scene closer than infinity to the imager, will appear to proportionally shift by a distance corresponding to the distance from one view to the next divided by the depth distance to each respective element. This would be equivalent to the appearance of moving any respective element horizontally in the opposite direction. When considering the eye as an imager, the human observer takes this perspective change for granted as (s)he moves his head laterally. This in fact, is recognized as one of the visual cues to depth perception exclusive of stereopsis. For example, with the imager in position 50, viewing a central perspective axis 52, and then moving a distance x1 to view position 54, and viewing along perspective axis 56 (which is parallel to 52), all points in the scene before the imager at positions substantially closer to the imager than infinity, will appear to have shifted a distance x1 in their respective depth planes. However, points at infinity or significantly separated from the imager, will not appear to have moved any distance in x. Similarly, if the imager then moves from view 54, to position 58, a distance of $x_2$ from position 50 and views along perspective axis 60, (which is parallel to 52) again, all elements in the scene will appear to have moved horizontally a distance of $x_2$ in their depth plane except those elements at infinity. The three views whether captured by an eye or a camera will show displacements of all objects in the view by the amounts $x_1$ and $x_2$, respectively, except those points in the views which are at infinity. With such movements the on-axis perspective axes 52, 56, and 60 are parallel, and the imager (the eye or the camera) can be thought of as rotating around a point at infinity. Note that the positions 50, 54 and 56 are aligned in the depth or Z dimension such as would be found in a jig of three cameras or a single camera with several apertures projecting adjacent images onto a single piece of film. FIG. 4, when cameras or camera apertures are placed at positions 50, 52 and 54, depicts a conventional depth image capture technique. Typically, a camera such as the Nishika N8000 35 mm has a separation between each of the four lenses of 18 mm.

Figure 5:
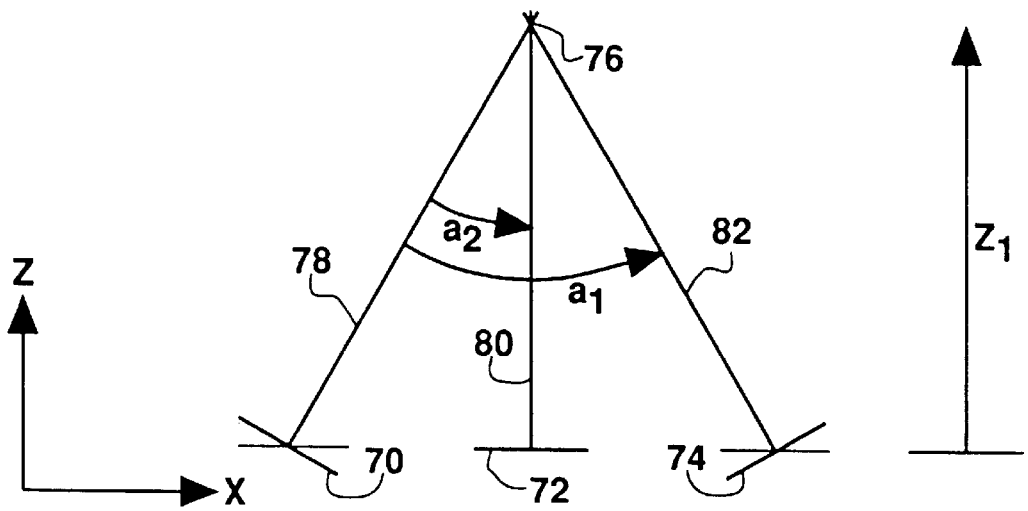
FIG. 5 illustrates a convergent perspective axis system.

Scenes can also be viewed or captured by rotating around a point closer than infinity, and FIG. 5 shows viewing conditions for three views where rotation is around a point a distance $Z_1$ away from the viewing location 72. At the viewing locations of the eye or camera, viewing locations 70, 72, and 74, respectively, the perspective axes are directed toward the point 76 along paths 78, 80 and 82, respectively. In this case, the viewer or camera can be thought of as rotating around the point 76 a distance $Z_1$ from the viewing location 72.

A window or reference frame is established by making a point on an area of highest interest remain stationary for all views of the subject. This point could agree with the convergent point 76.

A series of views taken or captured using the techniques shown in FIG. 4 or FIG. 5 can be used to generate depth images using lenticular techniques as described in the related applications. If the angle $a_1$ and angle $a_2$ (FIG. 5) are small between individual views, then the views 50 and 70, 54 and 72 and 58 and 74 will, to the human viewer, give a virtually identical sense of depth. The statement if angle $a_1$ and angle $a_2$ is small, is simply a statement that $Z_1$ is greater than the displacement distances $X_1$ and $X_2$ between views. If $Z_1$ is of the same order or is less than the displacement distance between views, the viewer will develop a sense that the image is being rotated before him and while not identical to the other technique, will still achieve a strong sense of depth and additionally, $a_1$ and $a_2$ will be larger.

Figure 6:
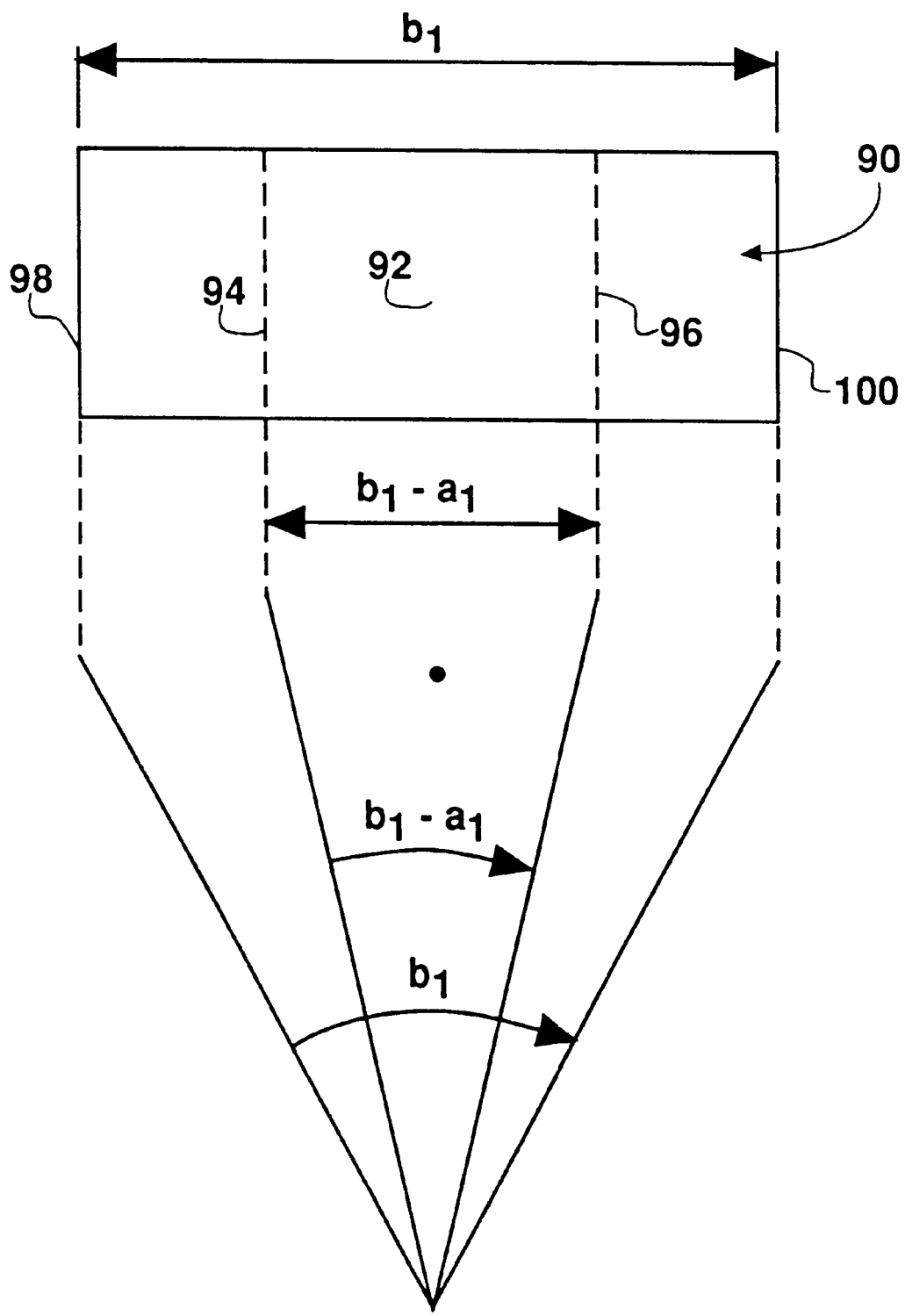
FIG. 6 depicts subtended angle reduction.

We have, to this point, considered the on-axis orientation of the viewing configuration. Now let us consider the scene as a whole. Any given view 90, as illustrated in FIG. 6, will have a point 92 within it corresponding to the position of the perspective axis for that view. The perspective axis is the line passing through the arbitrary (as determined by the photographer) centerpoint of the scene field and its corresponding location at the center of the imager focal plane. That is, the perspective axis is a line in space normal to the taking camera image recording plane and passing through the near nodal point of the taking camera lens system for any given perspective view of a depth image. A perspective view is one of a series of images of a given scene used to generate a depth image. The taking camera position relative to the scene is progressively changed with respect to rotation about the taking lens rear nodal point and/or lateral motion in mathematically predictable incremental steps from an extreme left position to an extreme right position in a plane nominally intended to include a human's eyes when viewing the same scene. For simplicity let us assume, though this is not necessarily the case, that point 92 is at the center of the view as shown FIG. 6. The edges 98 and 100 of the view to the left and right, will be displaced an angle to either side of the on-axis point 92 forming a subtended angle $b_1$ for the entire view. Let us assume also that $b_1$ is greater than $a_1$ (FIG. 5) and therefore within each view, whether the view is taken or captured under conditions shown in FIG. 4 or FIG. 5, the same information appears in the central area or at least across the area subtended by $b_1$–$a_1$, as shown by dashed lines 94 and 96. Thus, provided the angle $b_1$ is large enough to include the whole field of interest of the scene, then there is the same information in both FIG. 4 and FIG. 5 taking conditions.

Furthermore, the data collected in FIG. 4 and the data collected in FIG. 5 can be made equivalent simply by moving the central perspective axis and compensating for rotational magnification changes. For example, if pictures had been captured with a camera perspective geometry as shown in FIG. 4 and it is desirable to determine how the views would look as if the camera perspective geometry was as shown in FIG. 5, the point $z_1$ defining the location of the desired rotational point could be used in conjunction with the dimensions x1 and x2 (of FIG. 4) to calculate angles a1 and a2 (of FIG. 5), respectively. Since image focal planes 70, 72, and 74 are respectively perpendicular to perspective axis 78, 80, and 82, then these focal planes also represent angular rotations equivalent to the rotations of the perspective axes and the locations of picture elements lying on these focal planes, as shown in FIG. 4, can be converted to locations they would appear at in FIG. 5 by trigonometric calculations. This technique ensures that for any given scene situation, one view remains identical and unchanged after transformation as represented by 56 and 72 of FIG. 4 and 5 respectively, and other views such as 50 and 58 become equivalent to views 70 and 74 respectively. Thus, by the method of displacing the path and provided $b_1$ is sufficiently large, equivalent data can be collected in every situation. It should be noticed that changing the path is a first order effect. Second order effects do in fact occur due to changes in magnification, a slight warpage of the view (due to possible lens distortion), but these warpages can also be compensated for if desired. The reasons why these second order effects are not significant is that x is a few inches or less while Z is measured in feet.

Figure 1:
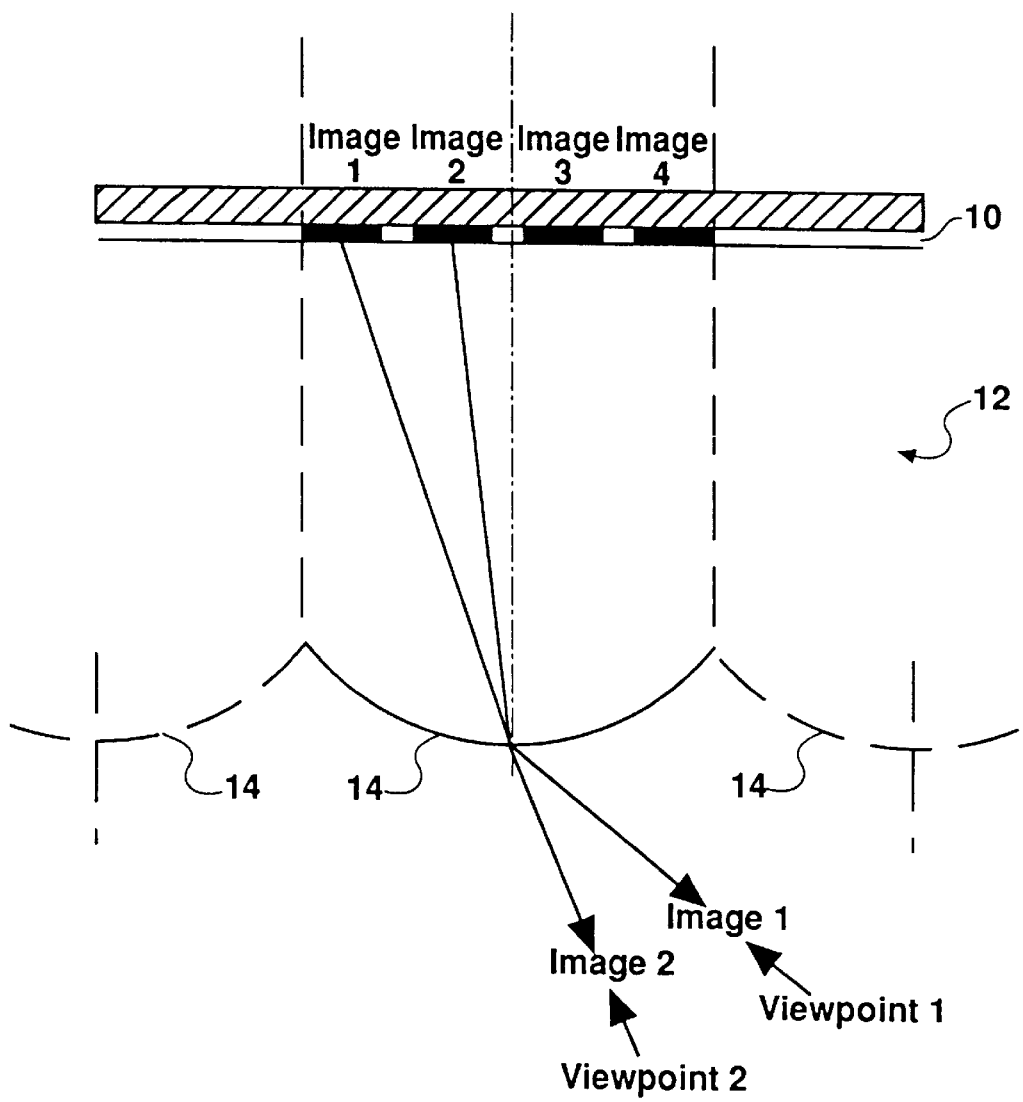
FIG. 1 illustrates the principles of image reproduction using lenticular or integral images.
Figure 2:
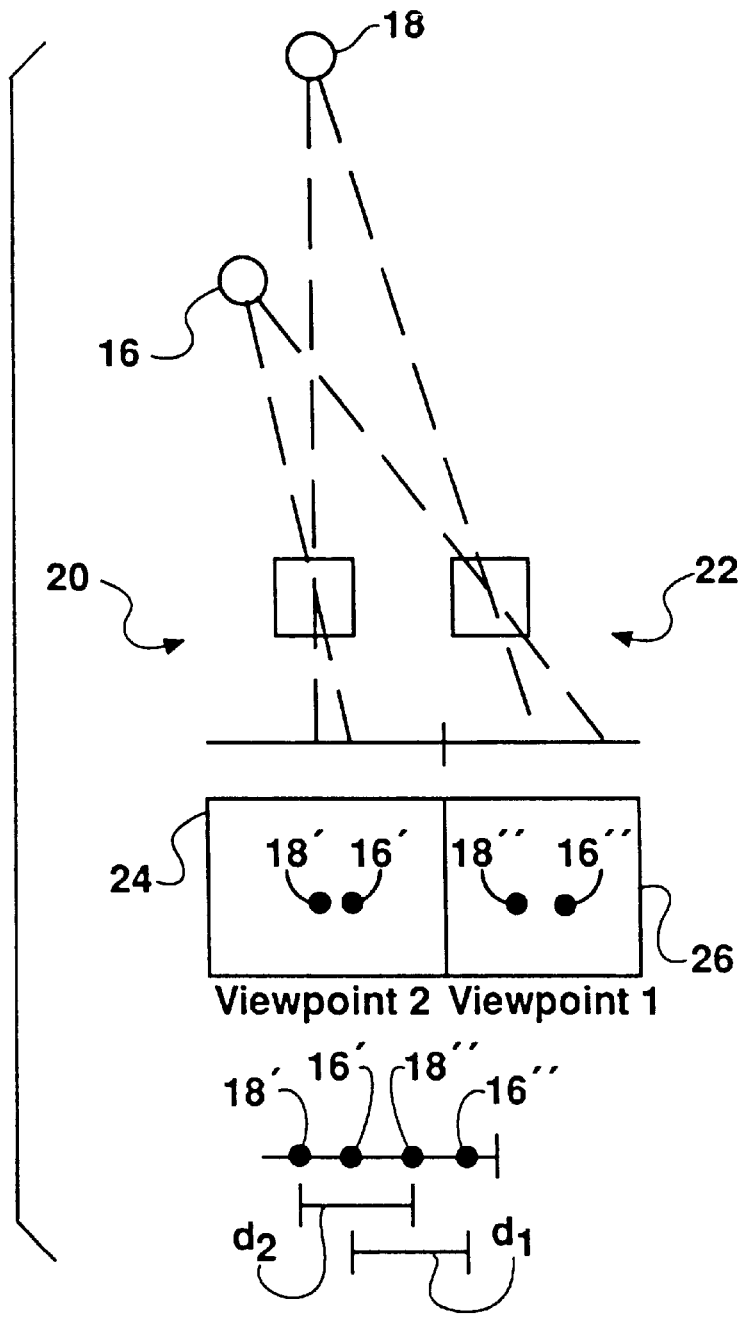
FIG. 2 illustrates an image jump or stutter problem.
Figure 7:
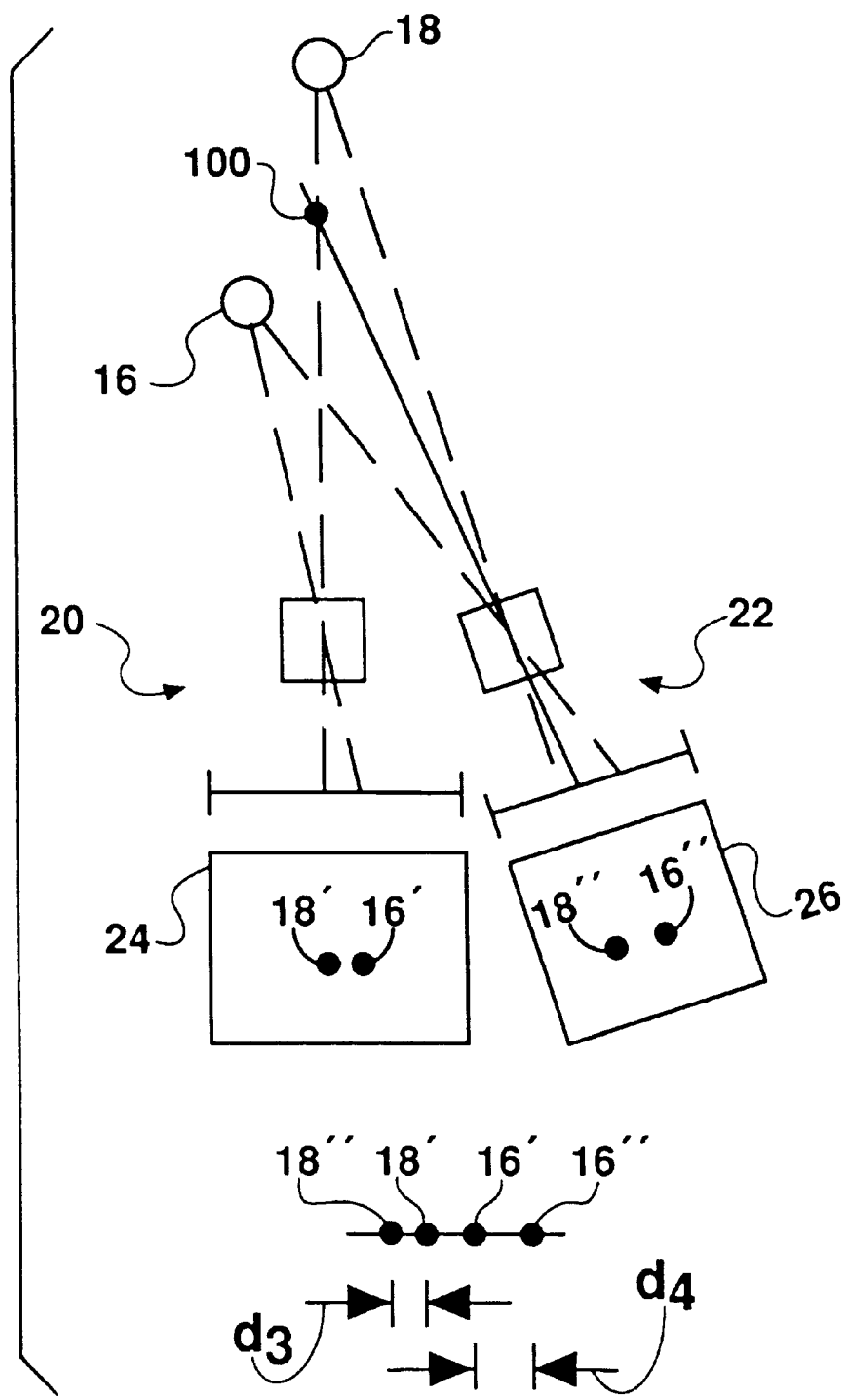
FIG. 7 illustrates how image jump can be reduced using a convergent perspective axis system.

The consequences of providing to the viewer of the photograph perspective oriented as in FIG. 5 as opposed to FIG. 4 can be seen by comparing FIG. 2 with FIG. 7. FIG. 1 shows the displacement of objects 16 and 18 between viewpoints 1 and 2 when the images are taken using the parallel perspective axis technique of FIG. 4. As previously discussed the jump or displacement of the objects in the scene is large and the relative jump or displacement is also large. FIG. 7 illustrates the same scene captured using the converging perspective axis technique of FIG. 5. As can be seen the displacement distance $d_2$ of object 18 in FIG. 2 is much greater than the displacement distance $d_3$ in FIG. 7. That is, the jump is less. The same holds true for object 16 when displacement distances $d_1$ and $d_4$ are compared. The images of FIG. 7 are taken by rotating the image plane about an arbitrary point 100 located between objects 16 and 18. If one of the objects is used as the rotation or perspective axis convergence point 100 the jump of that object will be zero but the image will rotate and the jump of the other object will increase. The reduction in jump will be maintained when the images are captured using the convergent perspective axis method of FIG. 5 or FIG. 7 and is printed as a lenticular print. The print will exhibit keystoning, which is an appearance of object rotation, but this is generally an effect that is expected when a user moves his head when viewing a real scene.

An image capture system in which the image perspective axes converge to an arbitrary point or a point of interest will reduce the amount of jump in the lenticular photograph as demonstrated above. Such a system can be constructed by a person of ordinary skill in the art by fixing the convergence point of a multi-aperture camera and angling the film within the camera to be perpendicular to the lens axis. A professional system could be constructed by those of ordinary skill in the art to provide a jig with angular positioning harnesses for several cameras, such that the cameras could be set to point at a single convergence point. Conventional swing back cameras could also be used such that the swing back holding the film is oriented perpendicular to the line to the convergence point. This point could be the object of interest within the scene or an arbitrary point and could be selected by the photographer.

Figure 8:
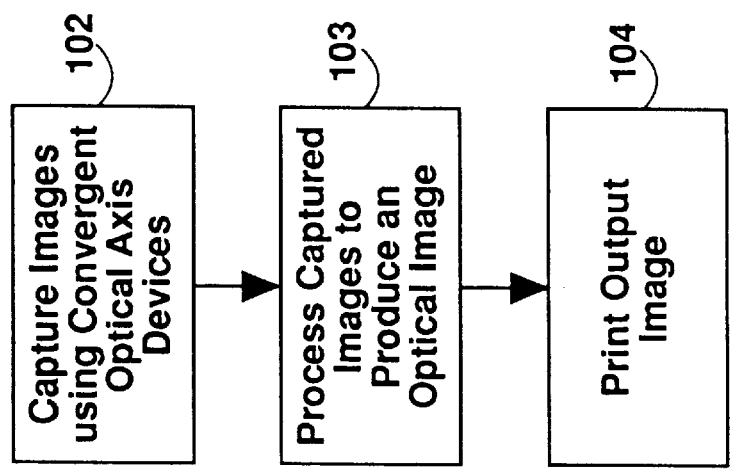
FIG. 8 illustrates a process for reducing jump.

As illustrated by the process of FIG. 8 the images would first be captured 102 using the convergent perspective axis camera setups discussed above. The captured images are then processed 103, using the techniques described in the related Taylor et al., Fogel and Manico applications previously mentioned, to produce 104 lenticular photographs with reduced jump.

Figure 9:
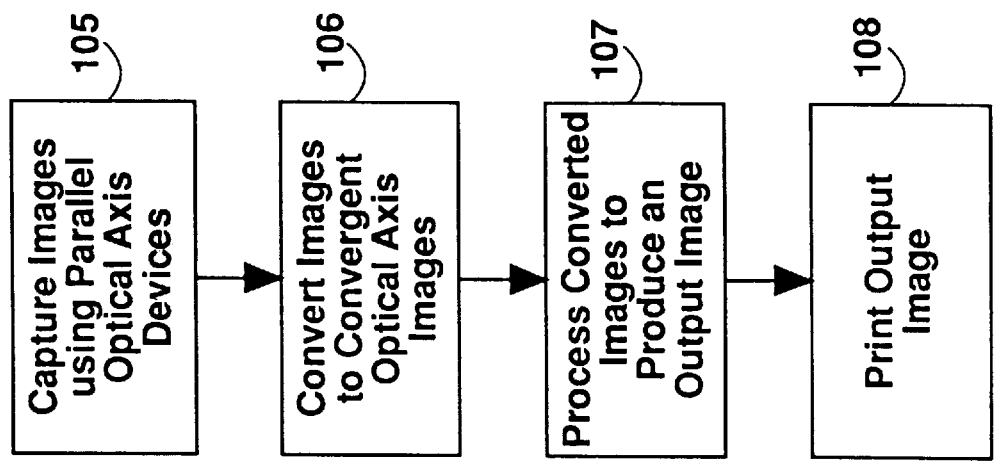
FIG. 9 illustrates another process for reducing image jump.

However, it is sometimes difficult to predict at the time of photographing an object scene exactly what convergent point will create the most effective depth print. Alternately, as illustrated in FIG. 9 if the images are captured 105 using the parallel perspective axis technique of FIG. 4, the views 50, 54 and 58 can be processed by a computer, such as mentioned previously, and converted 106 into views 70, 72 and 74 with convergent perspective axes by shifting the path and, if desired, performing the second order magnification corrections previously discussed. The transformation can be performed using equations set forth in Applied Photographic Optics by Ray, Focal Press London, pgs. 448–450 (1988) incorporated by reference herein.

Once the transformed images are obtained the processes discussed in the related applications can be performed 107 to produce 108 a lenticular photograph. If additional views are created between the original captured views or the converted views, by interpolation as described in the related Taylor and Fogel applications, it would be preferable to adjust the perspective axis of each of the created views to point at the same convergence point.

Figure 10:
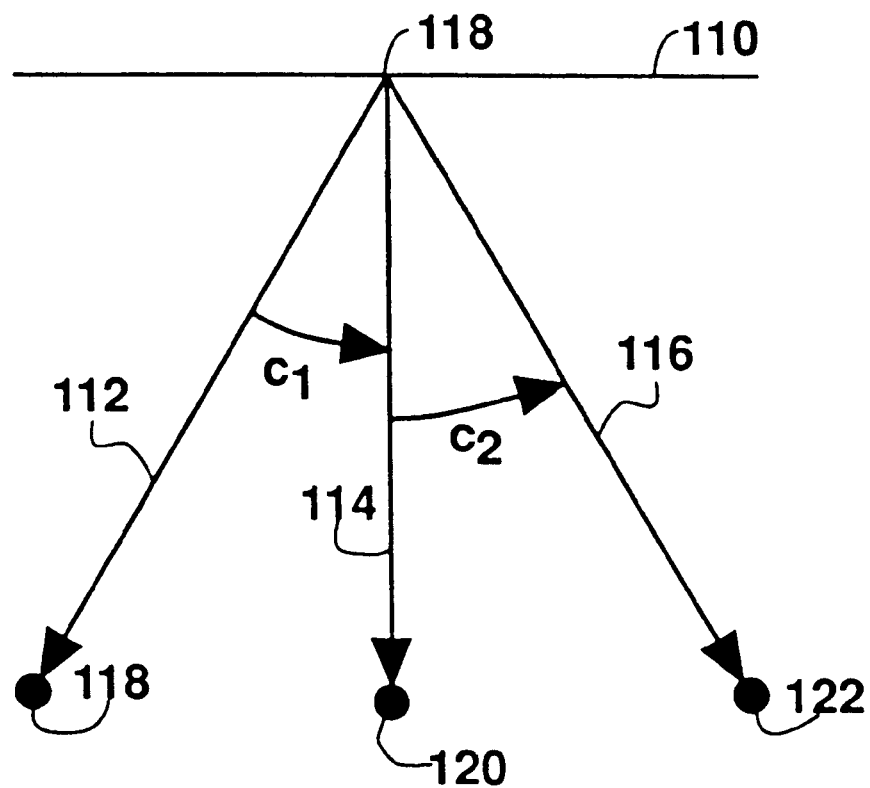
FIG. 10 depicts view angle axes.

Now let us return to the consequences of the convergence perspective idea on a display such as a depth image print. As shown in FIG. 10, a display of a depth image from a planar surface 110, such as a photograph or CRT display, can be considered as a number of views having principle display axes at different positions and the same angle, or at different angles. In a depth image, a line drawn from the center of a recorded image segment to the rear nodal point of a lenticule or lenslet projecting that image is refracted at the lenticule-air surface to a new line by an amount determined by Snell's law. That new line is the principle display axis for that recorded image segment. If the depth image is of the lenticular type having extended cylindrical optical surfaces, the set of lines drawn from the center of a recorded image segment line will describe a plane, as will the set of refracted lines. Therefore, the display axis angle must be measured in a plane normal to the axes of the lenticules. Thus, in FIG. 10 there are three views 112, 114 and 116 each with a perspective axis pointing to the same position 118 and for simplicity we will assume they are symmetrical, that is, angle $c_1$ equals angle $c_2$. The central perspective display view 114 need not be normal or perpendicular to the planar surface 110 of the display but is shown as such for simplification. The central perspective display view is the perspective view of a depth image that is visible to one eye of an observer at the middle of the angular display range. The principle display axis of any view can be perpendicular to the surface 110, such as axis 114, or can be at an angle with respect to surface 110 as shown by 112 and 116. In preferred depth images, there are more than three views (there may also be less) but three views will be considered for simplicity in this discussion. The principle display axes, 112, 114 and 116 correspond to the three views or viewpoints 118, 120 and 122, other parts of the scene at each viewpoint will emanate from other positions on the surface 110, and the other parts of the scene may correspond to rays which may or may not be parallel to any of the axes. Thus, for example, in the display shown in FIG. 10, the principle display axes for the three views or view points 118, 120 and 122 also produce other optical rays.

Figure 11:
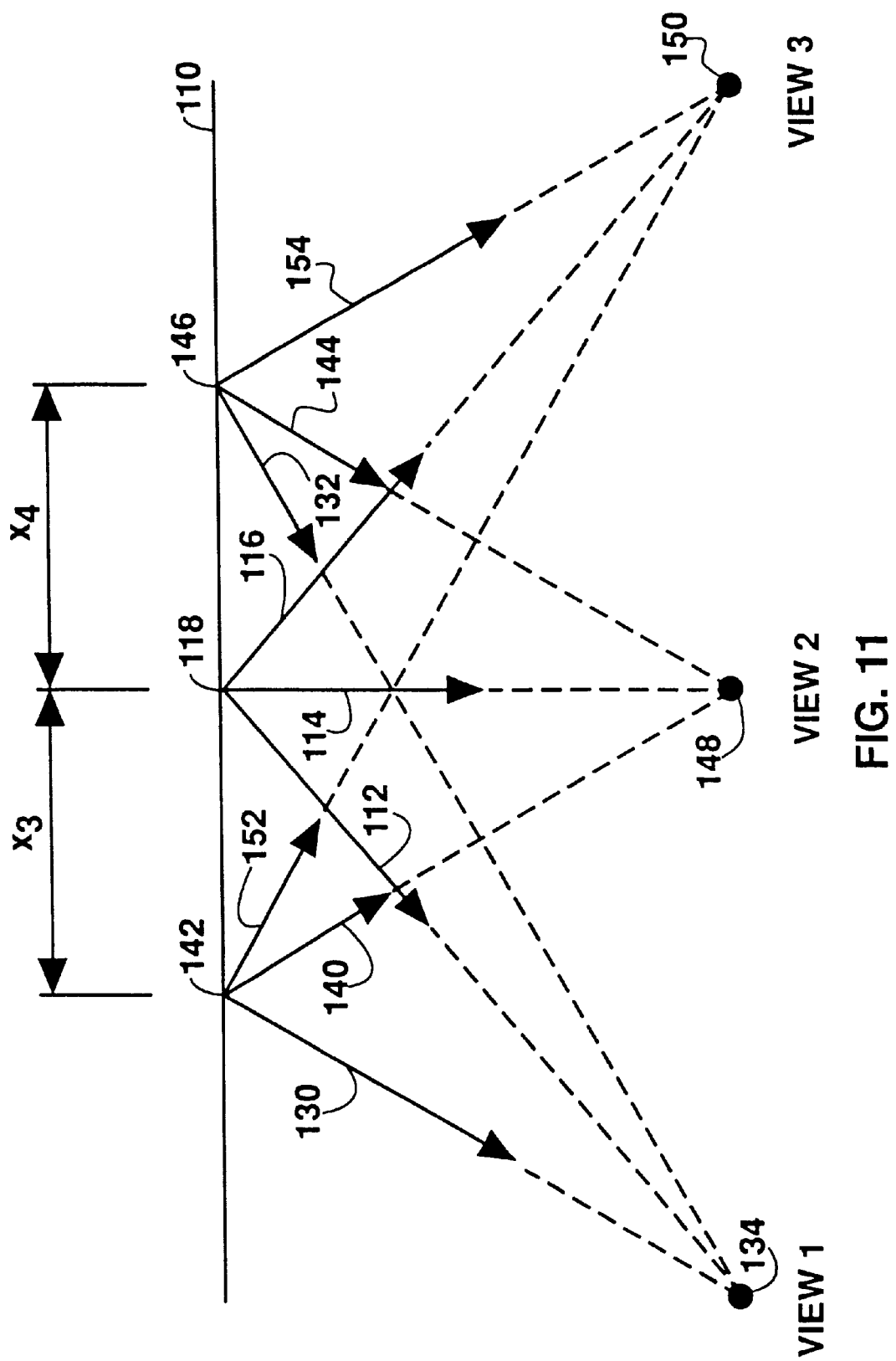
FIG. 11 illustrates how portions of images are combined into views.

For example, as illustrated in FIG. 11, view 1 with principle display axis 112, also has rays 130 and 132 converging at a viewpoint 134 emanating from different positions along the depth image. View 2 has principle display axis 114 with rays 140 emanating from point 142 and ray 144 emanating from point 146 and converging on point 148. Similarly, view 3 converges on point 150 using ray 152 from point 142 and ray 154 from point 146. Notice that the viewpoints 134, 148, and 150 need not be co-planar. The points 142 and 146 are displaced distances $x_3$ and $x_4$ respectively from the point 118. View 1 is responsible for and includes rays 130, 112 and 132, view 2 for rays 140, 114 and 144, and view 3 for 152, 116 and 154 and the rays at each view are combined by the eye into the complete scene. Points 134, 148 and 150 may or may not be co-planar.

When a viewer views a scene, the viewer may in fact assume that he is viewing it under the same taking conditions as shown in FIG. 4. This is illustrated diagrammatically in FIG. 12 where scene 170 is in fact viewed by the viewer at a series of in positions 172–182 along line 184. Constraining the viewer to view the scene in line 184 is a good first order approximation of looking around a subject centered at the center of the arc 190 since the eye/brain accommodates for or corrects for such movement with amazing facility. For example, when a viewer moves across a room where things are constantly changing in size, as defined by subtended angle, the viewer knows that the size is correct because the eye/brain corrects for the changes. Similarly, based on the available seeing clues similar corrective operations take place in terms of size and subtended angle when a depth image, such as a lenticular photograph, is viewed by a viewer and, thus, second order effects such as magnification warpage and distortion are not as serious as they may first appear to be.

Figure 12:
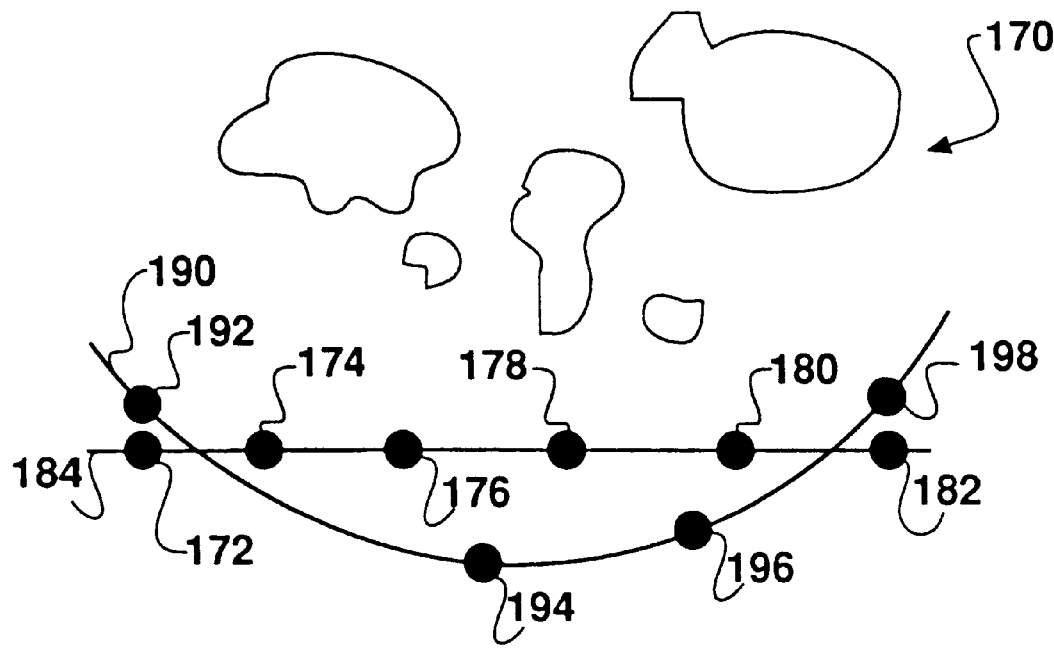
FIGS. 12 and 13 depict viewing relationships.
Figure 13:
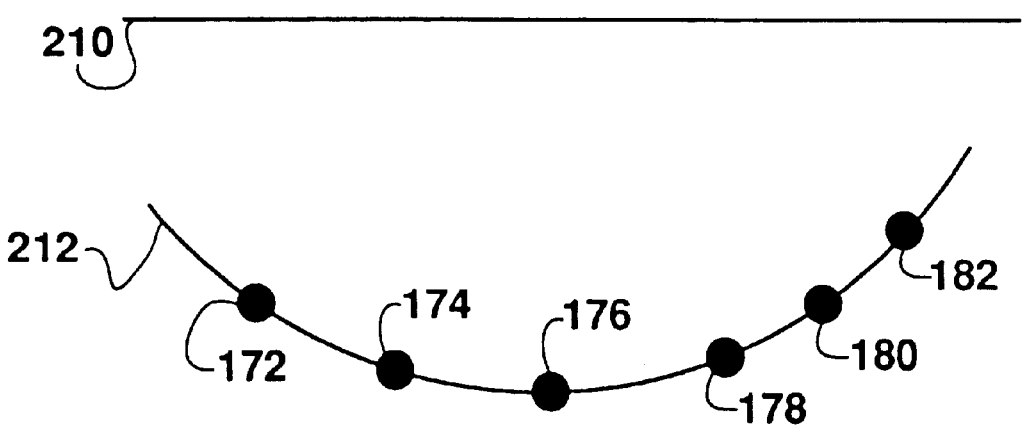

Alternatively, as also illustrated in FIG. 12, we may model that the viewer is viewing the scene along a line 190 which is not straight, for example, at viewing locations 192–198. These viewing positions are also satisfactory to a viewer. They may correspond to the viewer walking around the scene or the scene rotating in front of the viewer. Either situation (line 184 or 190) appears to contain enough information and does not introduce too great a distortion for the viewer to mentally develop a depth or three dimensional comprehension of the scene. It is, however, also possible that when reproducing a scene, for example as in FIG. 13, where the scene is a planar scene contained in plane 210 with a series of views as described with respect to FIG. 11, but with a shallow arc, that the views correspond, for example, at least to a first order to the views 172–182 but may not be contained in the straight line 184 (FIG. 12) but rather in a curved line 212 (FIG. 13). This distortion of the scene line again, provided it is moderate, does not appear to cause any great loss of fidelity in mind of the viewer. Similarly, the view along the curved line 190 (FIG. 12) may be reproduced along some other curvature or may be reproduced along a straight line without any great loss of fidelity. Thus the designer of a three dimensional or depth imaging system has the freedom of assembling the images along some line of view and to a first order may then reproduce them as if they were viewed along a different line of view without any great loss of fidelity.

Given that this freedom exists, the optimal criteria the designer of a three dimensional system should take advantage of to produce the most faithful reproduction of a three dimensional scene will be further discussed below. One criterion, as previously discussed, and elaborated on is the angle between the perspective axes used to capture the images and the principle display axis used to reproduce the images. Another is optimal angular resolution to minimize image jump effects which will be discussed in detail below. In most three dimensional viewing systems, as already referred to, the sense of three dimensionality is generated through assembling a set of views normally displaced in a horizontal direction but which may be displaced also in a vertical direction where exactly the same conditions, as already discussed, apply. As the viewer views across the scene, the viewer is in fact seeing a variety of views which enable the viewer to mentally assemble a three dimensional model of the scene that is being reproduced. There are a variety of different clues for three dimensions. One is, of course, the viewing of different views seen by the two eyes. This requires only two views but generally requires either glasses or appropriate alignment of the eyes in the directions of the two views. Another approach (and this is the approach preferred) is to use a multiplicity of views, so that at a particular head position each eye sees a different view but as the head is moved, the scene appears to smoothly change from one view to the next because the different views seen by each eye change in a coordinated synchronous manner. This obviously requires more than two views and in general requires a large number of views to give a feeling of look around freedom as would exist in an original scene. Image jump is a noticeable image shift that a viewer sees when he changes from one view to another. This jumpiness, of course, will be most visible at or by edges of objects within a scene. If the edges of each object are sharp, and are significantly displaced from view to view, then the effect of jump will be most obvious. Clearly an important aspect of the realism of any scene is to minimize this edge jump. One way to minimize jump is to minimize the shift in alignment of the same edge from one view to the next view.

One approach to minimizing this shift in alignment, is to make all views the same, this results in perfect alignment and zero jump and corresponds to an image without depth information, since the viewer sees the same thing from every view and there is no additional information from one view to the next.

Another approach is to minimize the displacement between views. This corresponds to either FIG. 4 or FIG. 5 in making the distances x: and $x_2$ and the angles $a_1$ and $a_2$ small. In fact, the displacements, $x_1$ and $x_2$ or angles $a_1$ and $a_2$ may be reduced, so that when the equivalent views are seen in the viewing situation (FIGS. 11–13) the actual displacement of object edges from view to view, is less than would actually occur if the viewer is seeing the whole original scene. In other words, the eye/brain combination is able to reconstruct a three dimensional scene with less scene displacement than is in the actual scene. This reduces image jump and improves the fidelity of the image.

Figure 14:
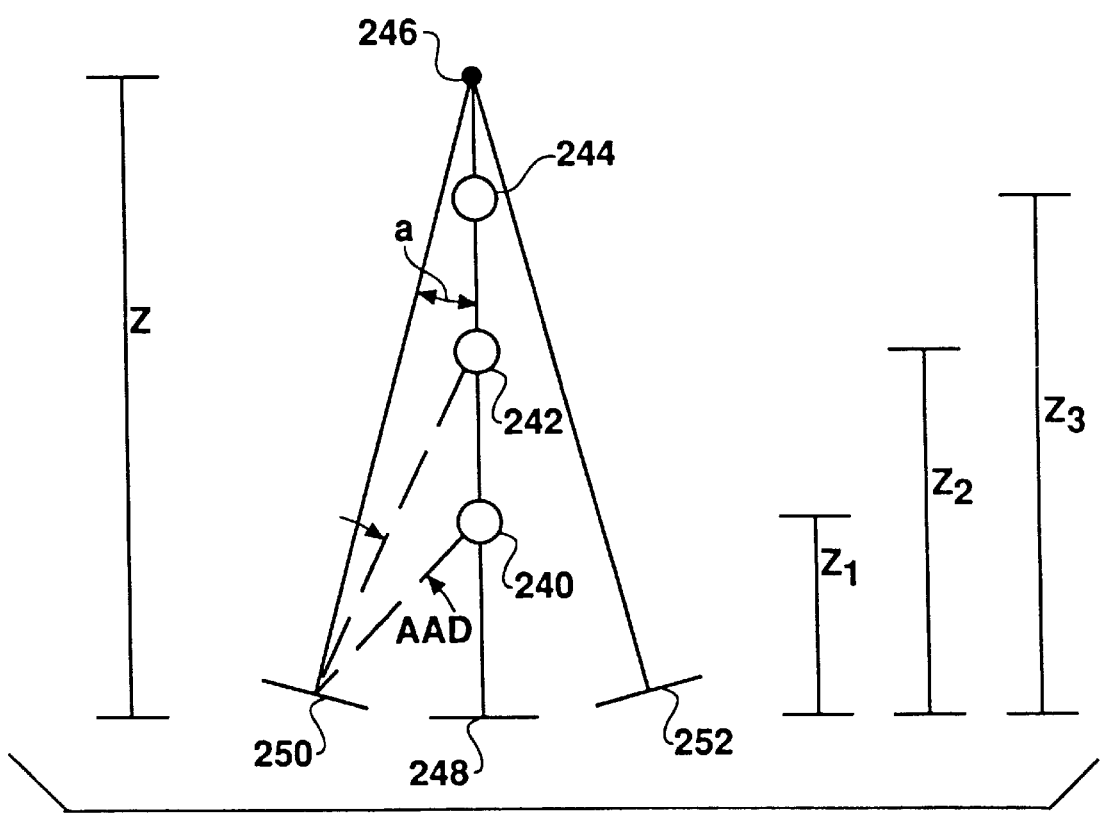
FIG. 14 illustrates angular relationships between objects in a view.

Although it is obvious that object edge displacement is proportional to viewing distance, it can be very easily reproduced geometrically by considering the elementary scene shown in FIG. 14. FIG. 14 shows a plan view of a scene which includes three vertical poles 240, 242 and 244 aligned in a row. Assume that the scene is viewed at three positions 250, 248 and 252 rotating around point 246 a distance Z from the taking lens of the central view 248. For simplicity of mathematics, it will be assumed that the point 246, is co-planar with the vertical poles, 240, 242 and 244. It will be readily appreciated, however, the principles discussed herein apply even if the simplifying addition of the point being co-planar with poles does not apply. At view 248, the viewer sees a single pole 240 because poles 242 and 244 are hidden behind and occluded by the pole 240. Assume that all poles 240, 242, and 243 are the same height, and that the lens at position 248 is positioned vertically below the top of the pole 240 and above bottom of the pole 240, so that only a single pole 240 is viewed at position 248. At position 250, three poles are viewed, with pole 244 being the left most and 240 being the right most. Assuming pole 240 is a distance $Z_1$ from the lens positioned at 248, 242 is a distance $Z_2$ from the lens 248 and 244 is distance $Z_3$ from the lens 248 and assuming the displacement angle is a, then in the scene the apparent angular distance (AAD) between pole 240 and 242 is given exactly by the equation (1).

$$\text{AAD} = \arctan(Z_2 - Z(1 - \cos a))/Z \sin a - \arctan(Z_1 - Z(1 - \cos a))/Z \sin a \quad (1)$$

If we now use the relationship:

$$\tan(A - B) = (\tan A - \tan B)/(1 + \tan A \tan B) \quad (2)$$

then equation (1) simplifies to:

$$\text{AAD} = \arctan((Z_2 - Z_1) Z \sin a/(Z^2 \sin^2 a + (Z_1 - Z)(1 - \cos a)(Z_2 - Z(1 - \cos a)))) \quad (3)$$

If we further assume that cosine a is approximately equal to one then we get a simplified equation for small a:

$$\text{AAD} = \arctan((Z_2 - Z_1) Z \sin a/Z_1 Z_2) \quad (4)$$

If we further assume that sin a is approximately equal to a because a is small, we get:

$$\text{AAD} = \arctan((Z_2 - Z_1) Z a/Z_1 Z_2) \quad (5)$$

This shows that the displacement from one field of view to the next is small when the angle a is small or $Z_2$ and $Z_1$ are close to each other. Thus, the jump can be reduced by doing one or a combination of three things in addition to or alternatively with those methods previously discussed. 1. Reducing the angle a or the distances $x_1$ and $x_2$ can be accomplished using to one of two approaches. Either increasing the number of views over a total viewing angle of the scene, or by reducing as we have already discussed, the subtended viewing angle a in the scene to be less than the views would be if the views were actually viewed in addition to or alternatively with those methods previously discussed. 2. Alternatively, we can reduce the difference between $Z_1$ and $Z_2$. This means reducing the amount of depth within the picture as a ratio of the total viewing distance. This corresponds to having three dimensional scenes with a range of depth within the scene which is limited. This is very similar to the constraint on depth of focus where focus is on a certain point but the available range of focus is limited within the picture and this technique is well known to serious photographers. They develop techniques for composing scenes so that when their camera has a small depth of focus, everything of interest is within focus. This is used, for example, in portrait photos. 3. The third technique is to increase $Z_1$ and $Z_2$ by a significant amount, for example, increasing $Z_1$ and $Z_2$ by the original value Z. This corresponds to being well back from the scene which is being taken. Thus we have identified four techniques, in addition to those previously described, two of which revolve around reducing the value of a, one reducing the difference between $Z_1$ and $Z_2$ and the fourth one which reduces the absolute ratio of $Z_1/Z$ and $Z_2/Z$.

Figure 15:
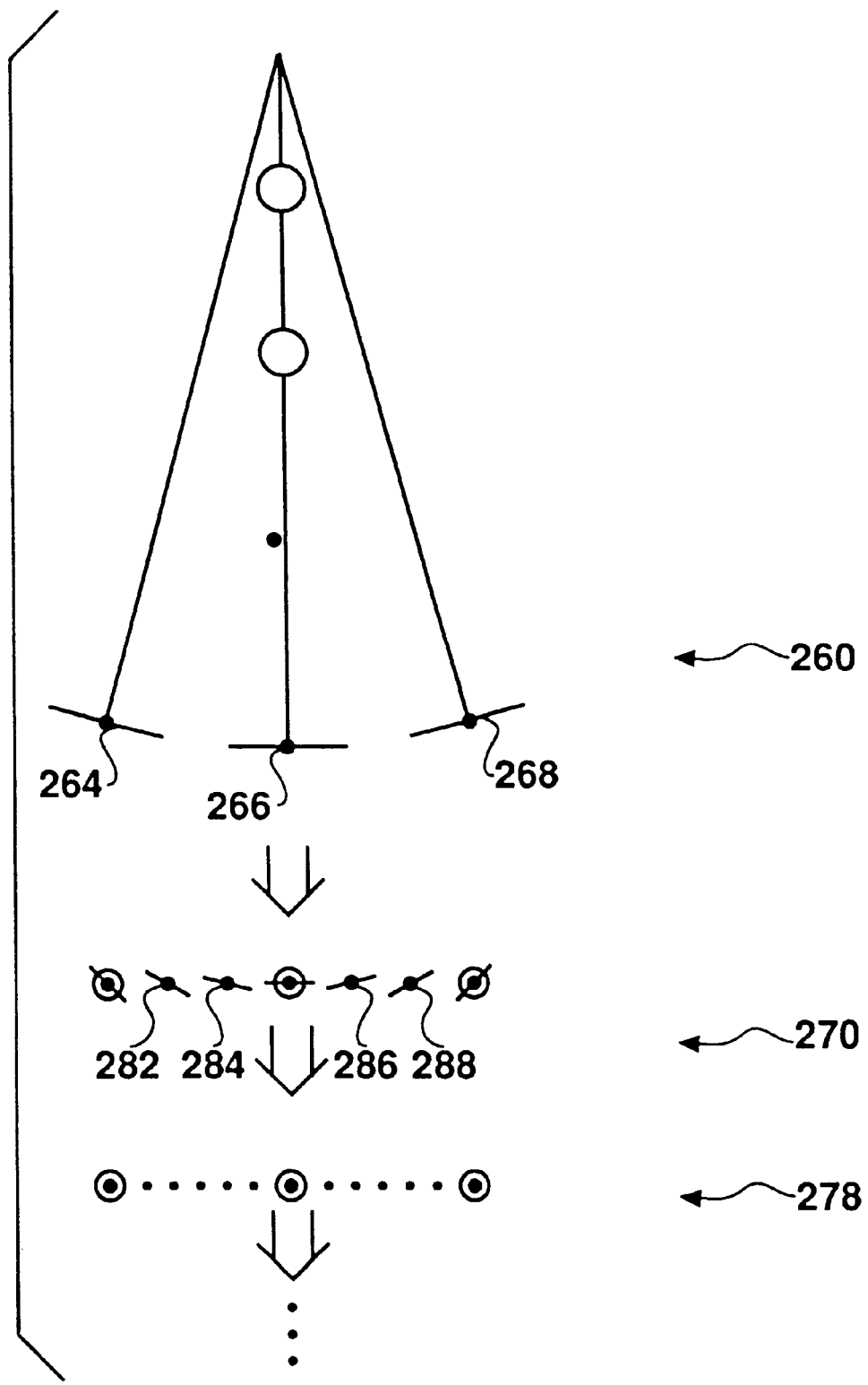
FIG. 15 illustrates how jump can be reduced by adding views.
Figure 16:
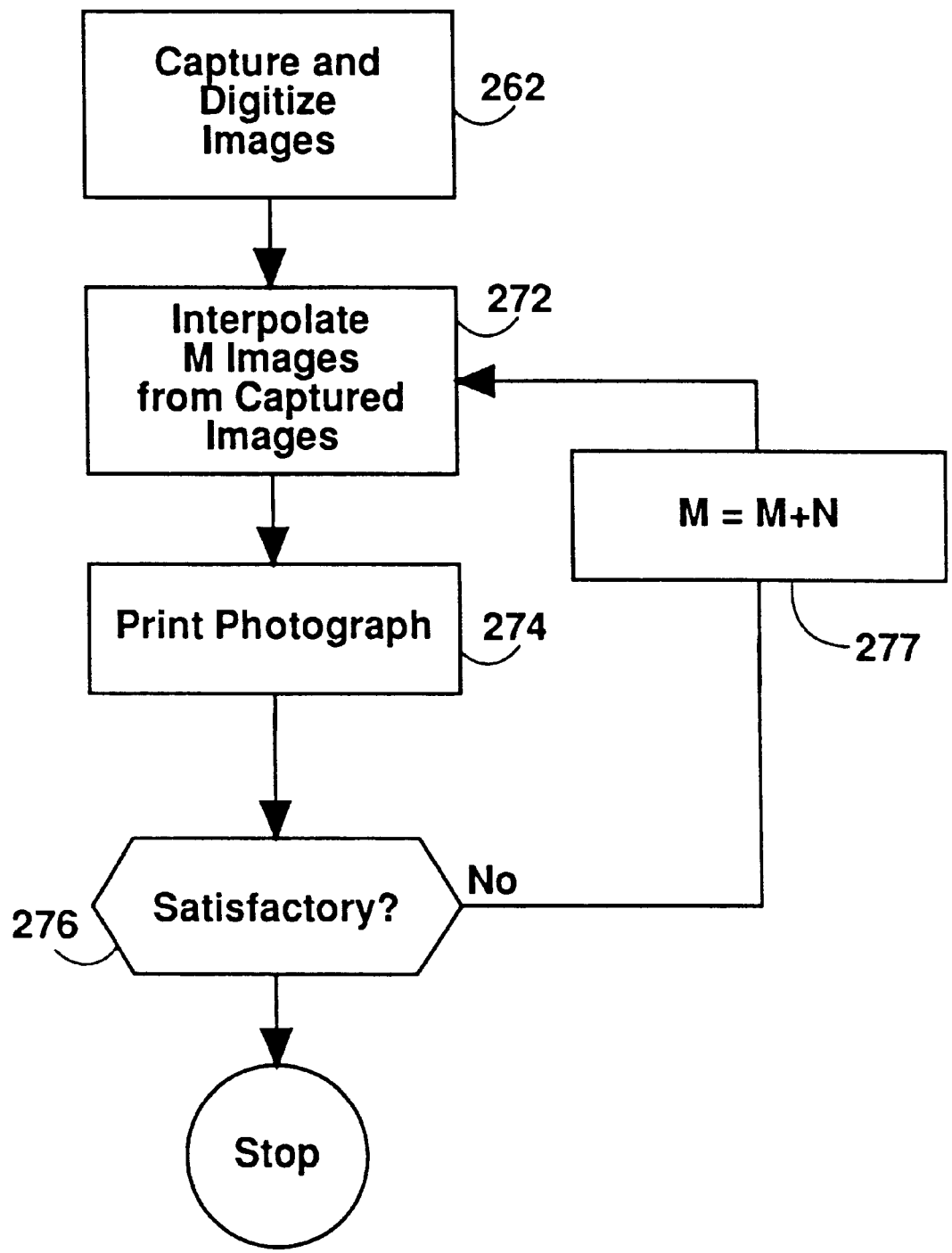
FIG. 16 depicts another process used to reduce image jump.

The first technique for reducing the angle a or the distances $Z_1$ and $Z_2$ involves increasing the number of views or images reproduced in the final lenticular photograph. This is graphically illustrated in FIG. 15 and the process is illustrated in FIG. 16. In a first stage 260 the physical images 264, 266 and 268 are captured 262 using a convergent perspective axis camera system (FIG. 5) or the images are captured using a parallel perspective axis system (FIG. 4). The parallel axis images can be converted into a convergent perspective axis images as previously discussed. It is preferred, but not necessary, that convergent perspective axis images be produced for processing in the succeeding steps. In a second stage 270 M intermediate images are interpolated 272 as discussed in the related Taylor and Fogel applications. The perspective axis of each interpolated image is rotated to converge, if convergent axis images are used, as previously discussed and a lenticular photograph is printed 274 as described in the related applications previously mentioned. The viewer (typically a development lab technician) looks at the photograph and judges 276 whether the image jump is reduced to a satisfactory. value. If not the number of images created by interpolation is increased 277, by some value N. The number can easily be determined experimentally for various lenticular overlay designs. Then, the greater number of images are created and printed in stage 278. Note that the actual views appear in the set of views of stage 278. This cycle of increasing the number of images can continue until the maximum resolution is reached, that is, when each line image under a lenticule is a single printed pixel wide. Alternately the number of images can be increased until the resolution of each view reaches some unsatisfactory appearance or still further the maximum number of views can be arbitrarily limited to some value such as 12 or 24. If such an arbitrary value is chosen the first stage 270 can create the maximum number of views. When a typical camera, such as that used in a professional studio, is used which produces several original images, at least 12 total images with the missing intermediate images being interpolated images is sufficient to reduce jump to an acceptable level. However, it is possible, using the preferred printer and a lenticular cover sheet with approximately 50 lenticules per inch, to produce a total of 24 views. If a technique such as described in the related Manico application is used a still larger number of views is possible. Of course as printer and lenticular technology advances a higher number views under each lenticule will be possible limited by the resolution of the recording medium.

In another approach which enhances depth resolution for each eye while reducing jump, but reduces the possible viewing positions, the interpolated number of images produced in step 270 can be divided into two sets each with a pair of reference views 282, 284 and 286, 288. Each set of views corresponds to one of the eyes of the person to view the final image. The views 264, 266 and 268 are discarded. Views are then created between the respective pairs and the created views are used to create the depth image with one half of the views in the final image for one eye and the other half for the other eye, as previously discussed.

Figure 17:
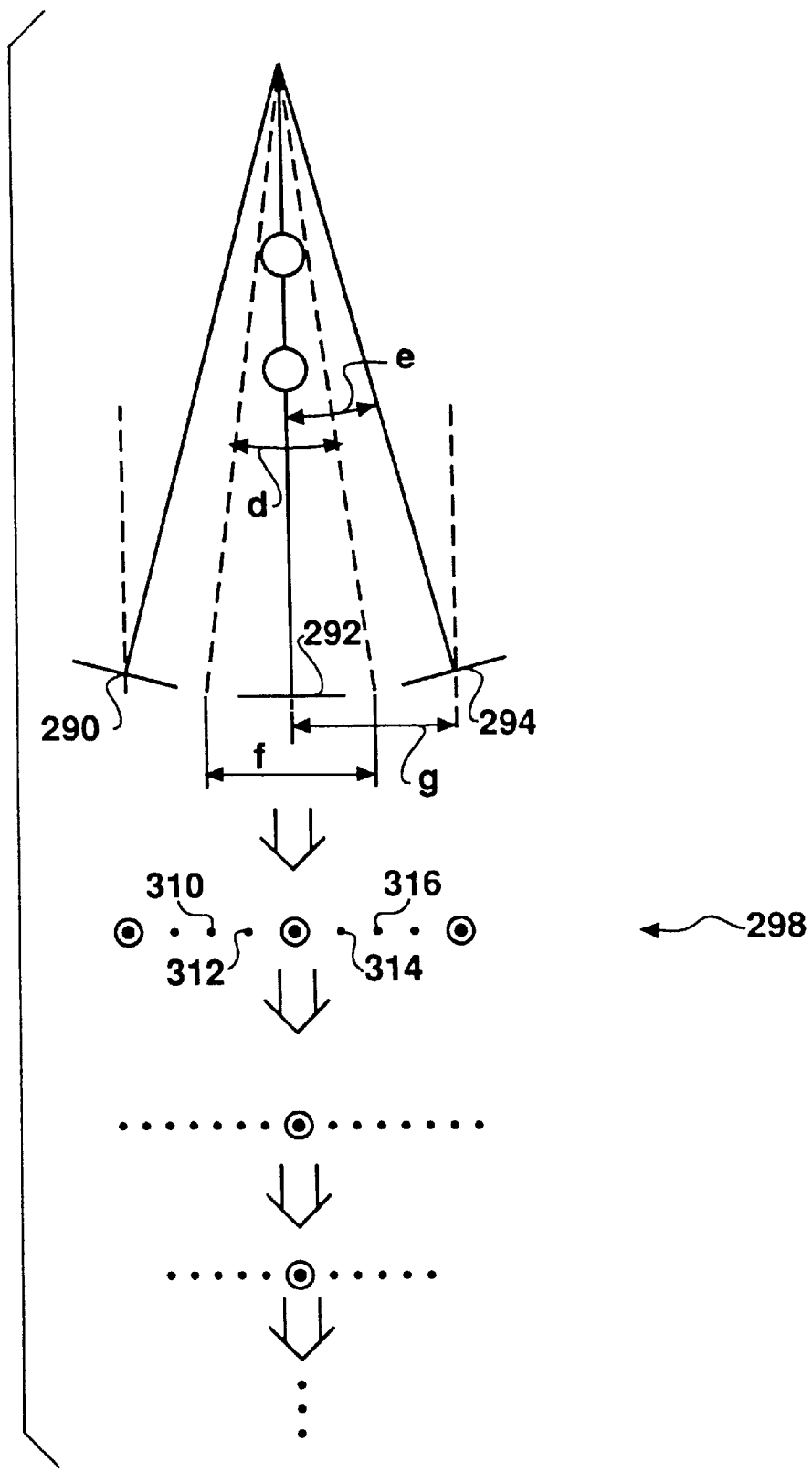
FIG. 17 illustrates how jump can be reduced by reduction of subtended angle.
Figure 18:
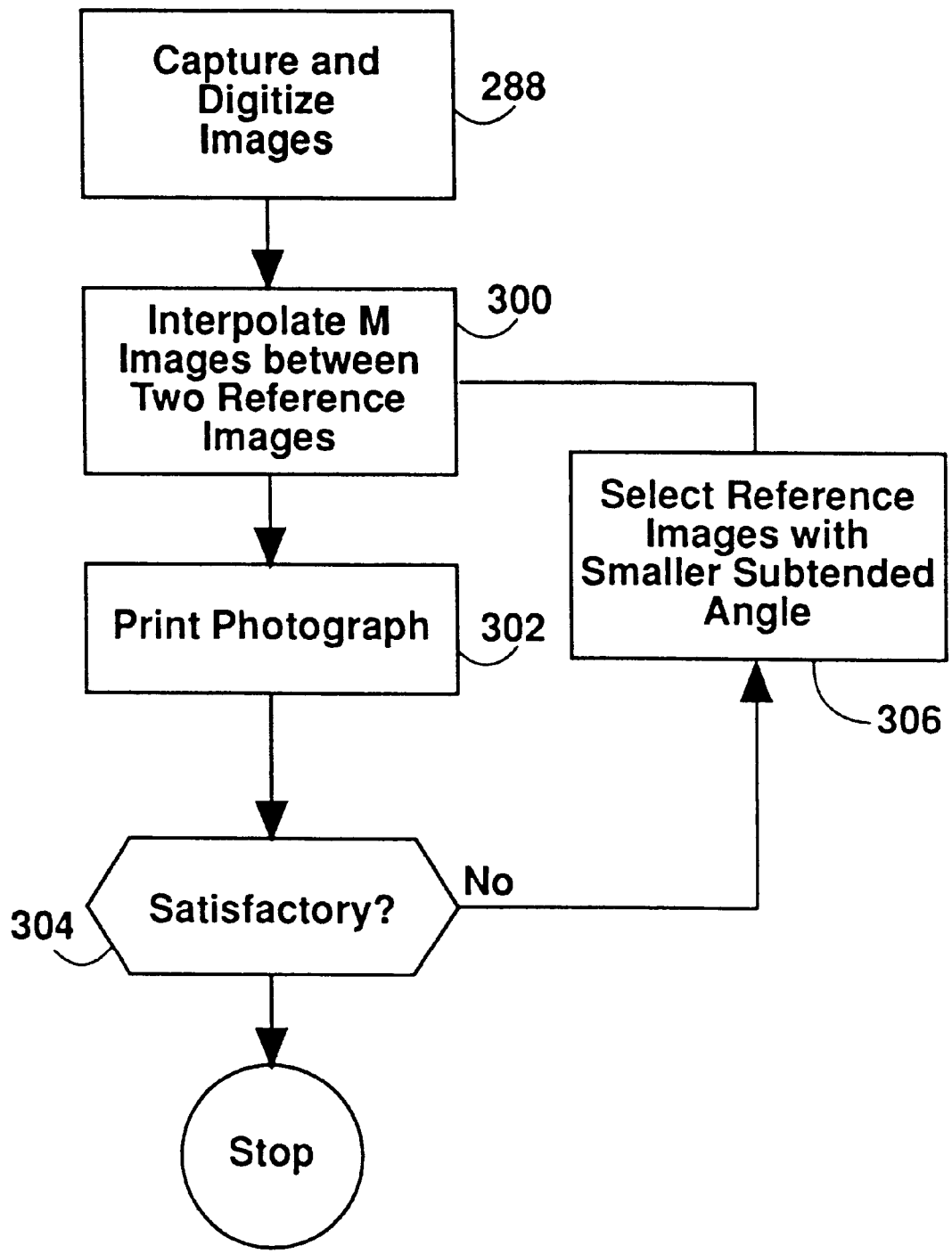
FIG. 18 depicts another process used to reduce image jump.

The second technique for reducing the angle a or the distances $x_1$ and $x_2$ is graphically illustrated in FIG. 17 and the process performed is illustrated in FIG. 18. In this method as in the previous method images are captured 288. The images, if captured using the parallel perspective axis approach (FIG. 4) are preferably converted into convergent perspective axis images 290, 292, 294 and 296, although conversion is not necessary. Conversion if performed should be performed immediately prior to print file construction. In a first stage 298 the captured views are interpolated 300, using the captured views 290 and 294 as reference views between which interpolation is performed, and the interpolated views are oriented, as previously discussed, with the original views appearing in the set of views produced in stage 298. As in the previous approach the lenticular photograph is printed 302 and reviewed. If not satisfactory 304 new reference views are selected which subtend a displacement angle d smaller than the original angle e between views, if a convergent axis system is used, or a distance f smaller than the distance g between views, if a parallel axis system is used. For example, if the distance between views taken at four feet is reduced from one inch apart to ¼ inch apart this will reduce stutter. The subtended angle d or distance f and the corresponding reference views can be selected by a technician or automatically selected based on some selection criteria based on factors associated with the intended viewing situation. For example, a poster or point of sale display will impose different constraints than a snap shot. The selected reference views can be the original captured views if several original views are captured or can be interpolated images as shown in FIG. 15 or a mix of captured and interpolated views. These reference views are used for another cycle of interpolation 300 and judgement 304. The cycle continues until a satisfactory photograph is produced or the limits previously discussed are reached. Of course, it is possible to automatically reduce the subtended angle to some value such as approximately 1.0 degree whenever a photograph is found to be unsatisfactory rather than going through several cycles of print judgement. A typical scene, which might include objects ranging from 3 to 10 feet captured using the Nimslo camera mentioned previously has a displacement of ¾ inches degrees between captured views and a subtended displacement of ¼ degree. When 3 views are created by interpolation between captured views this will substantially reduce the image jump in the typical lenticular photograph and thus ¼ degree is an appropriate angle by which to automatically reduce the subtended view. As a guideline the maximum displacement between views is governed by the convergence angle of the eyes looking at the scene.

The subtended viewing angle reduction operation can also be performed for each eye, so that each eye sees a different set of images. In this operation, two sets of views on either side of a center view can be chosen each with a pair of reference views 310, 312 and 314, 316 as shown in FIG. 17. The views between views 290 and 310, 312 and 314 and 316 and 294 are discarded. The pairs of reference views are used to interpolate new views where one half of the created new views are for one eye and the other half are for the other eye. The interpolated views are then used to create the depth image. Of course one or more of the reference views can be the original views if desired.

The techniques for reducing the difference between $Z_1$ and $Z_2$ or reducing the actual value of $Z_1$ and $Z_2$ will now be discussed. However, first we need to illustrate what happens when the viewed perspective axis and the captured perspective axis are different for the same view (image). The orientation of the perspective axis along which a scene lies when captured need not correspond to the orientation of the path along which the scene lies when viewed. Changing the path along which scenes are viewed as compared to when captured does not change, to a first approximation, the local content of the scene as can be seen from equations 4 and 5 because both those equations are relatively unaffected by an increased Z because to a first approximation, doubling will half "a", therefore, keeping the perceived angle relatively constant. That is to say, Z can be varied in consecutive views, thereby changing the path without appreciably changing the angles between the poles.

The viewing angle difference to a first order is simply a function of the difference in depth between the views for an on-axis situation. The equations for off axis situations are the same. The second order effects, depending on scene configuration, can be corrected by conventional warping within one view or by view to view warping.

Figure 19:
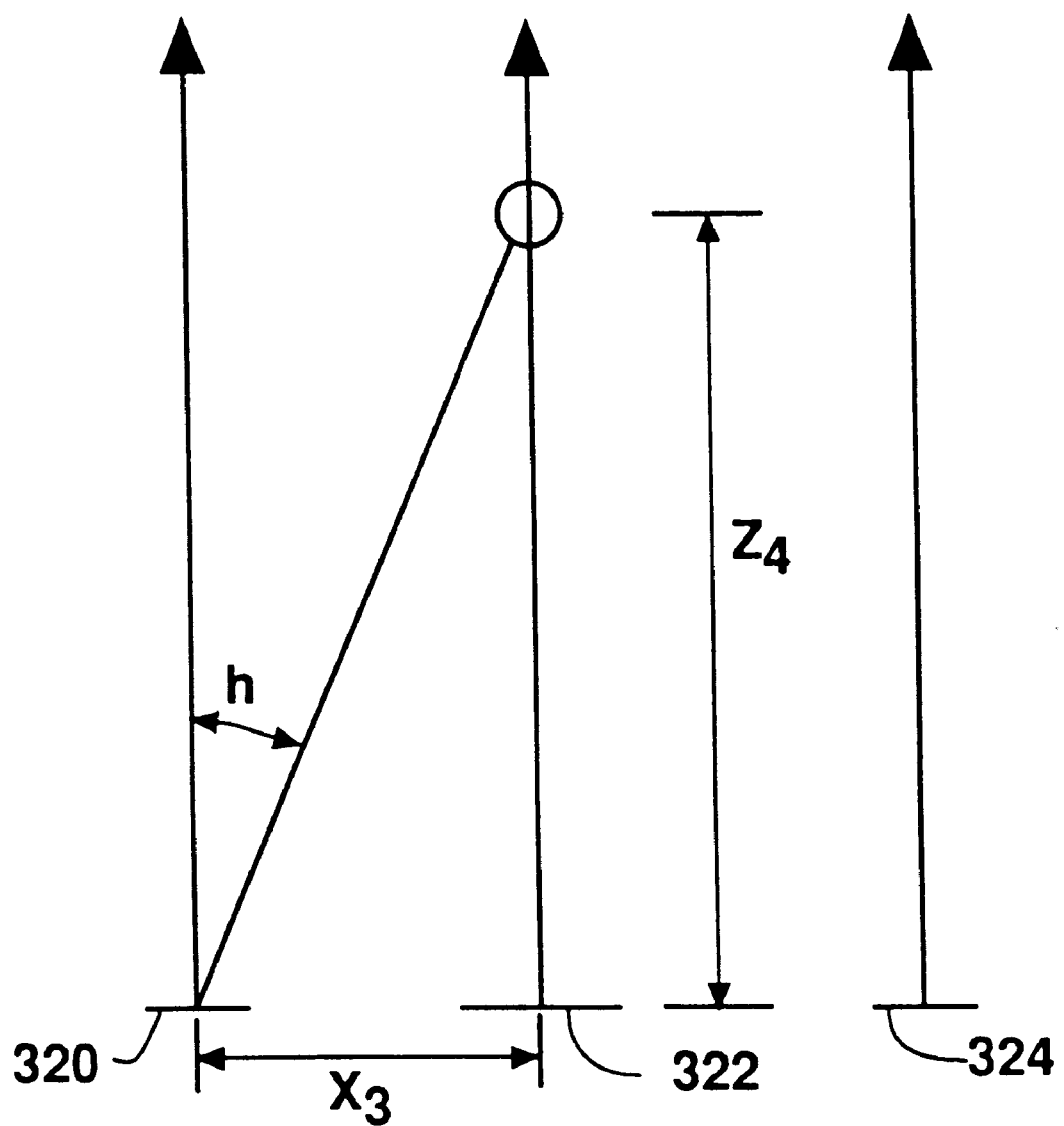
FIG. 19 depicts image displacement.

Note however, that the difference in angle between the views is not the only reason for the source of image jump. The other reason is that the rotation is around a point greatly separated in depth details of interest. Consider for example, the configuration shown in FIG. 19, where a single pole is observed vertically and the capture condition shown in FIG. 4 is reproduced then clearly although there is only one pole, the angle between that pole from view to view will be defined as $(X_3/Z_4)$. In the general case, related to FIG. 14, to minimize the jump angle for any given pole, it is only necessary to ensure that the rotation is around that pole.

Geometrically this means that although the taking condition may be taken parallel with perspective axes of the camera or lens (moving along a straight track), the display condition minimizes jump if the perspective axis of the views are radii of a circle centered on the detail of the picture. (As in this example, a pole which is the point of detail). Of course, this works best when the picture has one area of detail. Other perspective axis focal points are more optimal, when the area of detail of the picture is a region and the shape of region is identified through processing various captured images, such as between the areas of detail.

The next question is how is the geometrical relationship between the perspective axes to be modified to ensure that it is optimal for all situations. Clearly a photographer requires the ability to take a range of pictures without the complexity of changing the geometry of the camera. To overcome the complexity of changing the geometry of the camera, by knowing the geometry of the camera taking the views we can modify the perspective axis of the images to provide us with any perspective axis. In the case of capturing sequential images along a track by modifying the trip or picture taking point, as well as changing rail curvature, the perspective axis of the images can be altered by modifying the relative displacement between images in the scene. Relative displacement can be modified either during the exposure process or by a system where the images are electronically processed with a computer prior to printing or display by electronically shifting the image.

Figure 20:
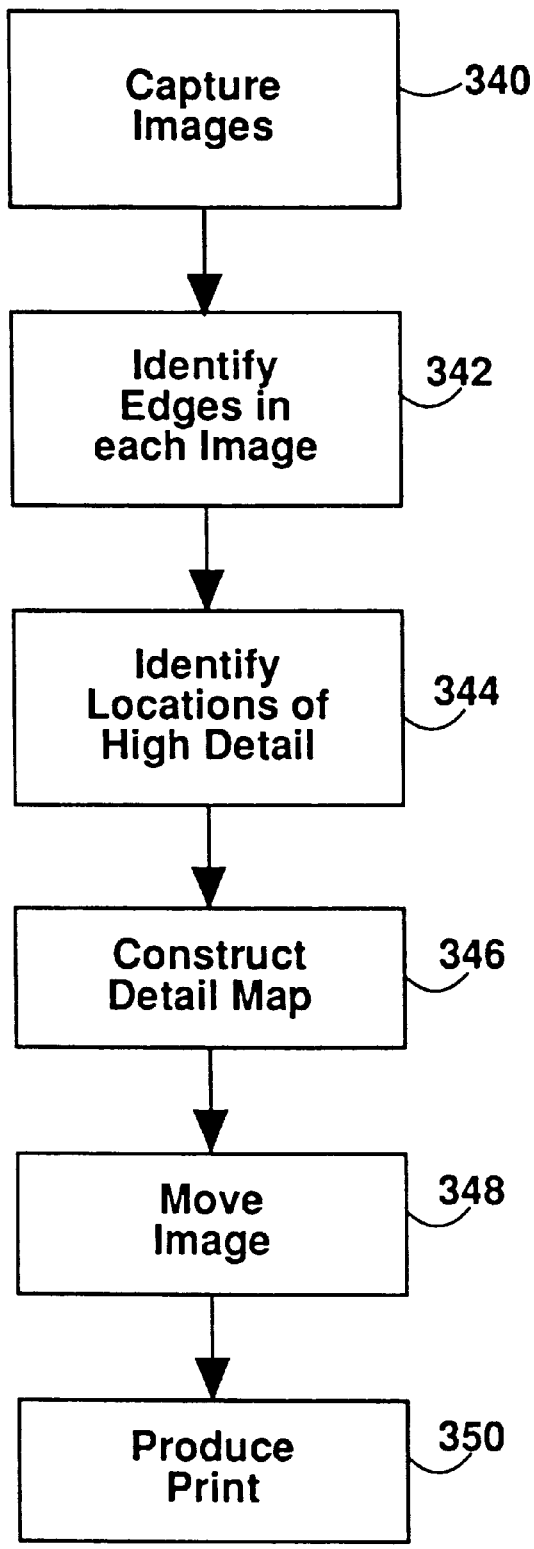
FIG. 20 illustrates another process to reduce image jump.

FIG. 20 is a block diagram of a method to process images to minimize image jump and thereby improve image quality in three dimensional or depth images. The method may be fully electronic or use film and scanning electronics. A camera which takes pictures with film and has four in-line lenses such as the Nimslo camera can be used to take 340 four perspective views.

Figure 21:
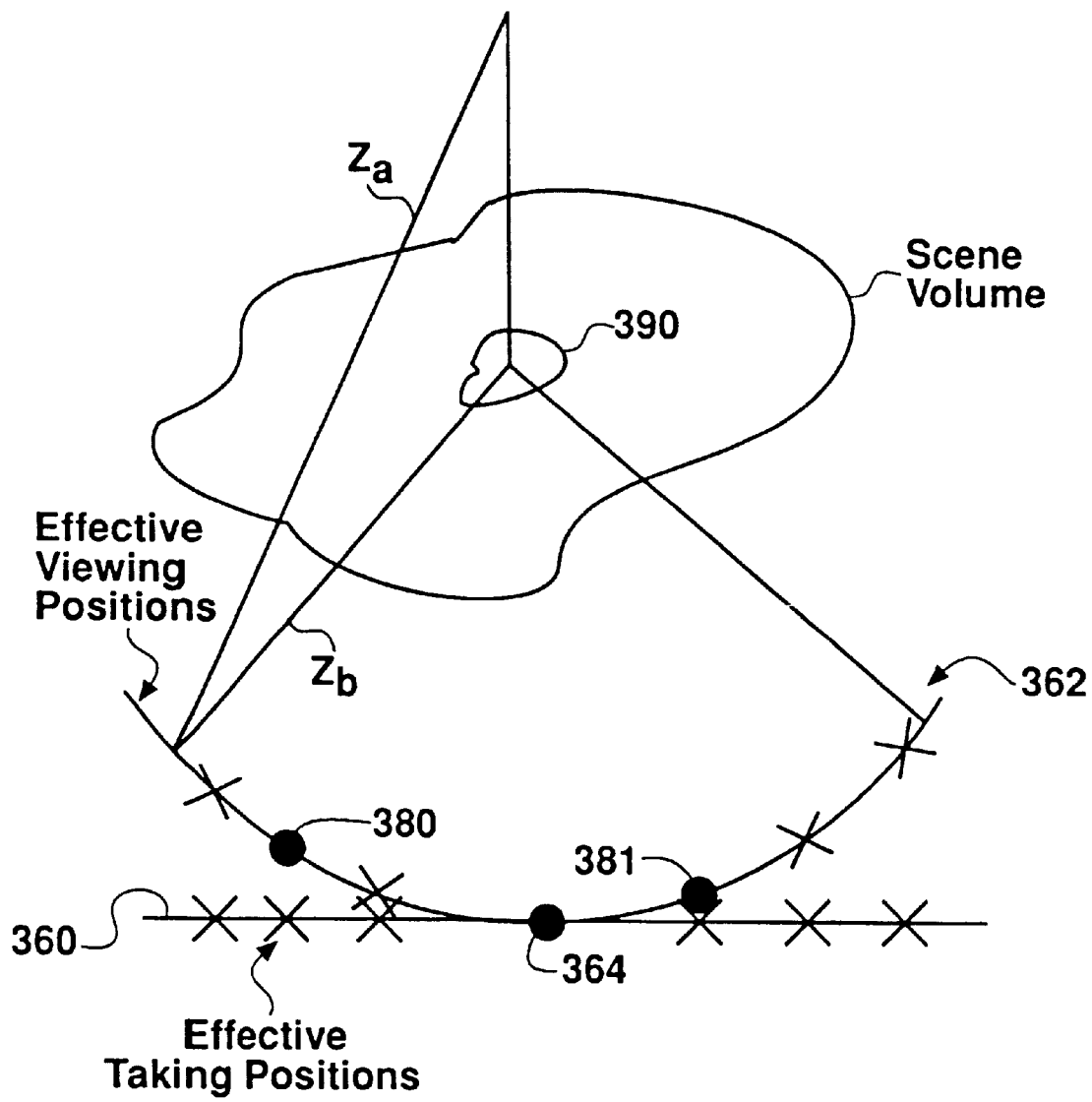
FIG. 21 illustrates the relationship used in the process of FIG. 18.

The roll of film is then developed and sequentially scanned in a scanner comprising a lens and a CCD to complete the capture 340 of the images. The images are then processed to identify 342 the X-Y locations of edges, in each image, for regions having a considerable density of edges across the scene using a conventional edge identification process such as discussed in A Threshold Circuit For Converting a Video Signal to a Binary Video Signal, R. R. A. Morton, U.S. Pat. No. 3,763,357, and Methods of and Apparatus for Determining the Quantity and Physical Parameters of Objects, R. R. A. Morton, U.S. Pat. No. 3,805,028, both incorporated by reference herein, where X is a horizontal location of an edge in each image and Y is a vertical location. These X-Y coordinates are used by a process as described in the related application by Fogel to determine 344 the Z locations of the areas of the edges of high detail (more specifically, details whose structure or sharpness is greater than the shift between consecutive views). A three dimensional map of the regions of high detail is then constructed 346 from the Z locations to identify the location of the high detail regions within the three-dimensional space captured by the camera system. This identification is performed by high pass filtering both two dimensional views to identify correspondence in each view. Having identified the regions of high detail in the image, the next step 348 is to angularly move the image in the X direction, so that the radius of the perspective axis of viewing rotates around the region of high detail 390. This is achieved as shown in FIG. 21, which shows the plan view of taking and effective viewing positions, by providing a linear angular shift, S, in each view 360 with respect to a reference view 364 given by the amount in equation 6.

$$S = \text{Arc tan } (Z_a - Z_b)^* \sin a / (Z_a(Z_a - Z_b)^* \cos a) \quad (6)$$

where $Z_a$ is the radius of the taking path in the original image, $Z_b$ the radius of the viewing path in the desired image and a is the displacement of any given view 362 which is being corrected from the taking view 360 by its relationship to the reference view 364. This shift moves the position of each pixel in the image in the x direction by the angular amount S limited by the width of field of view of the captured images. The reference view 364 is defined as the view against which the position of all other views are referenced. It is normally a view towards the center of the scene. The lenticular print is then produced 350 using the interpolation techniques previously described with respect to one view to another in the region of the highest detail, which has been minimized prior to interpolation processing. This should produce the same conditions as shown in FIG. 21 with the exception that every taking position needs to have an equivalent viewing position (meaning that is taking views 380 and 381 would have to be included).

Figure 22:
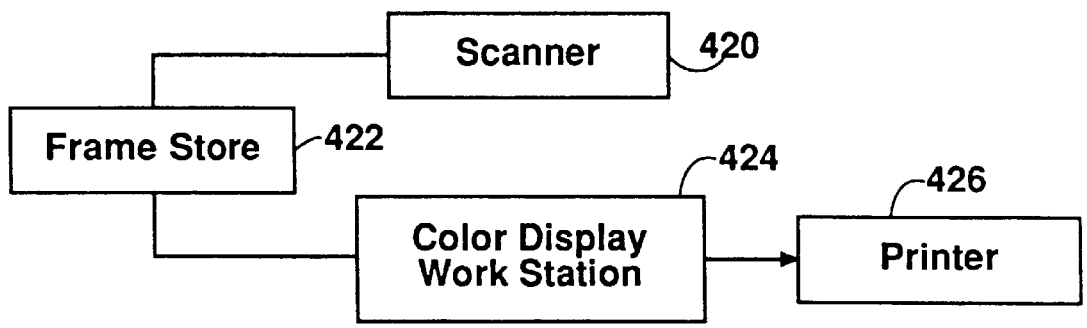
FIGS. 22 and 23 depict a method of reducing jump by aligning images to a point of rotation.
Figure 23:
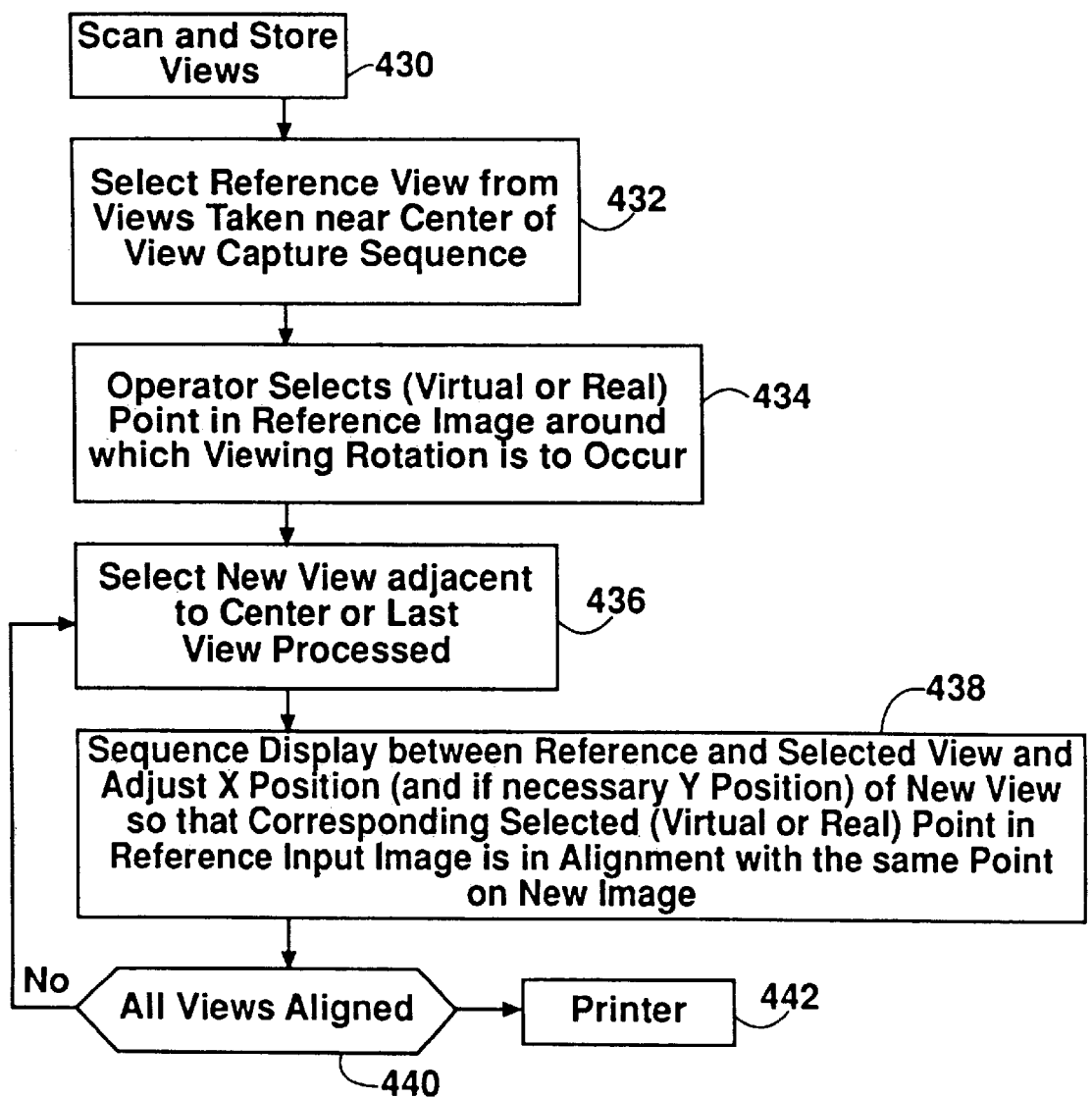

Another method that can be used to achieve the desired result of minimal stutter is to: scan the views on the film using a conventional scanner 420 (FIG. 22); store 430 (FIG. 23) the resulting views in a conventional framestone 422, which is controlled by computer 422 to provide image shifts for each view; display them on the workstation, such as a Sun Sparc 2 with 32 mb RAM and 16 MB disk; manually identify 432 and 434 an arbitrarily chosen point in a scene (usually a point which has the highest interest); and edit 436, 438 and 440 each view to shift the image components in the horizontal direction so that the chosen point in each view are coincident, and consequently the scene rotates around that point. Subsequently the edited images are combined and printed 442 by printer 426.

A manual method of selectively blurring the image, which will also reduce stutter, is detailed below. This method involves running application software (such as the Kodak Premier System with image sequential alternating capability) which allows the blurring of the image as a function of depth from the pivot point in the viewing condition by executing the following steps and manually using the alternating capability:

1. Advance across reference image on a regular pattern.
2. In each region (eg. background, middle ground, foreground) determine the displacement between views by observing the shift between each view in the region. Do this by adjusting the X-alignment of pairs of consecutive views. For each region the amount of shift defines the diameter of the air brush required. Return the alignment to its earlier value.
3. Air brush the same region in each view using the same diameter air brush.
4. Move on to the next region, repeating the process.

In the discussions herein shifts have been considered in views in angular units. Eventually, of course, these shifts need to be translated into actual pixel displacements in the view, that is, a distance in a view (a plane) by which particular pixel must be moved. If a view has width W, height H and subtends at angle i across its width, then the relationship to translate angular shift s to physical shift (Distance) is:

Distance=Ws/i

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of producing a depth image, comprising the steps of:
    (a) capturing views of a scene from various positions using convergent perspective axis imagers producing apparent viewing positions;
    (b) processing the views changing the apparent viewing positions; and
    (c) creating the depth image from the views.

2. A method as recited in claim 1, wherein the image is a lenticular photograph.

3. A method as recited in claim 1, further comprising creating views between the captured views by interpolation.

4. A method of producing a depth image, comprising the steps of:
    (a) capturing views of a scene from various positions using parallel perspective axis imagers producing apparent viewing positions;
    (b) converting the views into convergent perspective axis views and changing the apparent viewing positions of the views; and
    (c) creating the depth image from the captured views.

5. A method as recited in claim 4, wherein the image is a lenticular photograph.

6. A method of producing a depth image comprising the steps of:
    (a) capturing views of a scene from various positions, the views having actual visual displacements therebetween producing apparent viewing positions;
    (b) producing created views from the captured views with created visual displacements therebetween less than the actual visual displacements changing the apparent viewing positions produced by the actual visual displacements; and
    (c) creating the depth image from the created views.

7. A method as recited in claim 6, wherein the image is lenticular photograph.

8. A method as recited in claim 6, wherein step (b) includes creating a pair of created views for each eye.

9. A method of producing a depth image, comprising:
    (a) capturing a view of a scene from various positions, the views having actual visual displacements therebetween producing apparent viewing positions;
    (b) producing created views from and between the captured views using interpolation where the created views and captured views have created visual displacements therebetween less than the actual visual displacements changing the apparent viewing positions produced by the actual visual displacements; and
    (c) creating the depth image from the created views.

10. A method as recited in claim 9, wherein the image is a lenticular photograph.

11. A method of producing a depth image, comprising the steps of:
    (a) capturing views of a scene from various positions, the views with actual visual displacements therebetween producing apparent viewing positions;
    (b) creating a created view between the captured views by interpolation where the created view and one of the captured views have a created visual displacement therebetween smaller than the actual visual displacement changing the apparent viewing positions;
    (c) creating interpolated views between the one of the captured views and the created view by interpolation; and
    (d) creating the depth image from the interpolated views.

12. A method as recited in claim 11, wherein the image is a lenticular photograph.

13. A method of producing a depth image, comprising the steps of:
    (a) capturing views of a scene from various positions, the views with actual visual displacements therebetween producing apparent viewing positions;
    (b) creating created views between the captured views by interpolation where the created views have a created visual displacement therebetween smaller than the actual visual displacement changing the apparent viewing positions;
    (c) creating interpolated views between the created views by interpolation; and
    (d) creating the depth image from the interpolated views.

14. A method as recited in claim 13, wherein the image is a lenticular photograph.

15. A method as recited in claim 13, wherein step (b) includes creating a pair of created views for each eye.

16. A method as recited in claim 15, wherein the image is a lenticular photograph.

17. A method of producing a depth image, comprising the steps of:
    (a) capturing views of a scene with a perspective axis and from various positions producing apparent viewing positions;
    (b) modifying the perspective axis of the views changing the apparent viewing positions; and (c) creating the depth image from the modified perspective axis views.

18. A method of producing a depth image, comprising the steps of:
(a) capturing views of a scene with a perspective axis and from various positions Producing apparent viewing positions;
(b) identifying a volume in the scene with the greatest number of image edges;
(c) shifting the perspective axis of the views to rotate around the volume changing the apparent viewing positions; and
(d) creating the depth image from the shifted perspective axis views.

19. A method of producing a depth image, comprising the steps of:
(a) capturing views of a scene from various positions producing apparent viewing positions;
(b) identifying areas of highest detail in each view;
(c) correlating the areas and determining displacement distances between the correlated areas;
(d) determining a minimum displacement distance;
(e) displacing each view the minimum displacement distance changing the apparent viewing positions; and
(f) creating the depth image for the displaced views.

20. A method of producing a depth image, comprising the steps of:
(a) capturing views of a scene from various positions producing apparent viewing positions;
(b) identifying alignment points in each scene which correspond to a same scene point;
(c) shifting each view to align the alignment points changing the apparent viewing positions; and
(d) creating the depth image from the shifted views.

21. A method of producing a depth image, comprising the steps of:
(a) capturing views of a scene from various positions producing apparent viewing positions;
(b) determining displacements between the views;
(c) airbrushing objects in the views having a stuttering characteristic using the displacements as airbrushing diameters changing the apparent viewing positions; and
(d) creating the depth image from the airbrushed views.

22. A depth image apparatus, comprising:
a substrate including recorded images, the recorded images having a subtended viewing angle therebetween which reduces stutter to a visually non-distracting amount and changes apparent viewing positions of the recorded images as recorded; and
depth image display means confronting said substrate for producing a depth image from the recorded images.

23. An apparatus for producing a depth image, comprising:
first, second and third image capture devices with image planes oriented to a convergent point and capturing convergent images from various positions producing apparent viewing positions; and
means for producing a depth image having changed apparent viewing positions from the convergent images.

24. An apparatus for producing a depth image, comprising:
first, second and third image capture devices with image planes oriented in parallel toward infinity producing non-convergent images from various positions producing apparent viewing positions;
means for converting the non-convergent images to convergent images changing the apparent viewing positions; and
means for producing a depth image from the convergent images.

* * * * *